(12) United States Patent
Zheng et al.

(10) Patent No.: US 12,100,209 B2
(45) Date of Patent: Sep. 24, 2024

(54) IMAGE ANALYSIS METHOD AND SYSTEM

(71) Applicant: HUAWEI CLOUD COMPUTING TECHNOLOGIES CO., LTD., Gui'An New District (CN)

(72) Inventors: Pengpeng Zheng, Shenzhen (CN); Jiahao Li, Shenzhen (CN); Xin Jin, Beijing (CN); Dandan Tu, Shenzhen (CN)

(73) Assignee: HUAWEI CLOUD COMPUTING TECHNOLOGIES CO., LTD., Gui'An New District (CN)

( * ) Notice: Subject to any disclaimer, the term of this patent is extended or adjusted under 35 U.S.C. 154(b) by 469 days.

(21) Appl. No.: 17/365,089

(22) Filed: Jul. 1, 2021

(65) Prior Publication Data

US 2021/0326634 A1 Oct. 21, 2021

Related U.S. Application Data

(63) Continuation of application No. PCT/CN2019/107126, filed on Sep. 21, 2019.

(30) Foreign Application Priority Data

Jan. 23, 2019 (CN) .......................... 201910065251.0

(51) Int. Cl.
*G06F 16/587* (2019.01)
*G06F 16/583* (2019.01)
(Continued)

(52) U.S. Cl.
CPC .......... *G06V 20/41* (2022.01); *G06F 16/5854* (2019.01); *G06F 16/587* (2019.01);
(Continued)

(58) Field of Classification Search
CPC ...... G06V 20/41; G06V 10/764; G06V 10/82; G06V 20/70; G06V 40/20; G06F 16/5854;
(Continued)

(56) References Cited

U.S. PATENT DOCUMENTS

2008/0193010 A1 8/2008 Eaton et al.
2017/0193286 A1* 7/2017 Zhou .................... G06V 40/172
(Continued)

FOREIGN PATENT DOCUMENTS

CN 102880692 A 1/2013
CN 104244086 A 12/2014
(Continued)

OTHER PUBLICATIONS

Peter Ondruska, et al., "End-to-End Tracking and Semantic Segmentation Using Recurrent Neural Network", arXiv: 1604.05091, 2016, pp. 1-9. (Year: 2016).*

*Primary Examiner* — Ross Varndell
*Assistant Examiner* — Dustin Bilodeau
(74) *Attorney, Agent, or Firm* — Maier & Maier, PLLC

(57) ABSTRACT

An image analysis method, including: obtaining influencing factors of t frames of images, where the influencing factors include self-owned features of h target subjects in each of the t frames of images and relational vector features between the h target subjects in each of the t frames of images, self-owned features of each target subject include a location feature, an attribute feature, and a posture feature, and t and h are natural numbers greater than 1; and obtaining a panoramic semantic description based on the influencing factors, where the panoramic semantic description includes a description of relationships between target subjects, rela-
(Continued)

tionships between actions of the target subjects and the target subjects, and relationships between the actions of the target subjects.

9 Claims, 10 Drawing Sheets

(51) Int. Cl.
    *G06N 3/04* (2023.01)
    *G06V 10/764* (2022.01)
    *G06V 10/82* (2022.01)
    *G06V 20/40* (2022.01)
    *G06V 20/70* (2022.01)
    *G06V 40/20* (2022.01)

(52) U.S. Cl.
    CPC ............. *G06N 3/04* (2013.01); *G06V 10/764* (2022.01); *G06V 10/82* (2022.01); *G06V 20/70* (2022.01); *G06V 40/20* (2022.01)

(58) Field of Classification Search
    CPc ...... G06F 16/587; G06N 3/044; G06N 3/045; G06N 3/08; G06N 3/049; G06T 7/60; G06T 2207/20081; G06T 2207/20084
    See application file for complete search history.

(56) References Cited

U.S. PATENT DOCUMENTS

| | | | |
|---|---|---|---|
| 2018/0115706 A1* | 4/2018 | Kang | ........................ G06T 5/70 |
| 2020/0019764 A1* | 1/2020 | Sun | ....................... G06V 40/165 |
| 2021/0133461 A1* | 5/2021 | Ren | ........................... G06T 7/11 |

FOREIGN PATENT DOCUMENTS

| | | |
|---|---|---|
| CN | 103345764 B | 2/2016 |
| CN | 106650617 A | 5/2017 |
| CN | 108197589 A | 6/2018 |
| CN | 108416776 A | 8/2018 |
| CN | 108509880 A | 9/2018 |
| CN | 108510012 A | 9/2018 |
| CN | 108960330 A | 12/2018 |
| EP | 2993618 A1 | 3/2016 |

* cited by examiner

IMAGE ANALYSIS METHOD AND SYSTEM

CROSS-REFERENCE TO RELATED APPLICATIONS

This application is a continuation of International Application No. PCT/CN2019/107126, filed on Sep. 21, 2019, which claims priority to Chinese Patent Application No. 201910065251.0, filed on Jan. 23, 2019, the disclosure of which is hereby incorporated by reference in its entirety.

TECHNICAL FIELD

The embodiments relate to the image processing field, and in particular, to an image analysis method and system.

BACKGROUND

A task of an image description is generating a corresponding text description for a given image. The image description may automatically extract information from the image and generate the corresponding text description based on the automatically extracted information, to translate the image into knowledge. For example, the picture description may generate a text description such as "a man is surfing on the sea" for an image shown in FIG. 1A.

Currently, image description can only perform a low-level semantic description on the image. Only a single-subject single action (for example, the man is surfing on the sea in FIG. 1A) or a multi-subject single action (for example, a group of students are doing morning exercises in FIG. 1B) can be described. However, image description cannot perform a panoramic semantic description on the image. Relationships between a plurality of subjects, relationships between the subjects and actions, and relationships between the actions (for example, a man sees that a woman is knocked down by a vehicle in FIG. 1C) cannot be described.

SUMMARY

The embodiments provide an image analysis method and system, to perform a panoramic semantic description on an image.

According to a first aspect, an image analysis method is provided, including:

obtaining influencing factors of t frames of images, where the influencing factors include self-owned features of h target subjects in each of the t frames of images and relational vector features between the h target subjects in each of the t frames of images, self-owned features of each target subject include a location feature, an attribute feature, and a posture feature, t and h are natural numbers greater than 1, the location feature is used to indicate a location of a corresponding target subject in the image, the attribute feature is used to indicate an attribute of the corresponding target subject, the posture feature is used to indicate an action of the corresponding target subject, and the relational vector features are used to indicate relationships between target subjects; and obtaining a panoramic semantic description based on the influencing factors, where the panoramic semantic description includes a description of the relationships between target subjects, relationships between actions of the target subjects and the target subjects, and relationships between the actions of the target subjects.

In the solution, the higher-level panoramic semantic description can be obtained based on location features, attribute features, and posture features of a plurality of target subjects in a plurality of frames of images and relational vector features between the plurality of target subjects in the plurality of frames of images, to better reflect relationships between the plurality of subjects, relationships between the subjects and actions, and relationships between the actions in the images.

In some possible implementations, the obtaining influencing factors of a panoramic semantic description includes:

extracting features of the t frames of images to obtain t feature vectors;

extracting location features of the t feature vectors to obtain the location features;

extracting attribute features of the t feature vectors to obtain the attribute features;

extracting posture features of the t feature vectors to obtain the posture features; and extracting relational vector features of the t feature vectors to obtain the relational vector features.

In some possible implementations, the location features, the attribute features, the posture features, and the relational vector features are extracted by a same convolutional neural network (CNN).

In the solution, the same CNN is used to extract the location features, the attribute features, the posture features, and the relational vector features. Therefore, when the location features, the attribute features, the posture features, and the relational vector features are extracted, previously extracted feature vectors may be used, to avoid extracting the vector features for a plurality of times, and reduce a calculation amount. There is no need to extract the feature vectors when the location features are extracted, extract the feature vectors when the attribute features are extracted, extract the feature vectors when the posture features are extracted, or extract the feature vectors when the relational vector features are extracted.

In some possible implementations, region-of-interest pooling is performed on a feature vector i based on a target subject a and a target subject b that are in an image i to obtain a feature vector $V_{a,b}$ corresponding to the target subject a and the target subject b, where i, a, and b are all natural numbers, $0 < i \leq t$, $1 \leq a, b \leq h$, and the feature vector i is extracted based on the image i.

Region-of-interest pooling is performed based on the target subject a to obtain a feature vector $v_{a,a}$ corresponding to the target subject a.

A relational vector feature $V^i{}_{ab}$ between the target subject a and the target subject b that are in the image i is calculated according to the following formula:

$$G_{a,b} = \frac{1}{\sum \|v_{a,b}\|} (w_{a,b}(v_{a,b}, v_{a,a}) v_{a,b})$$

$w_{a,b}$=sigmoid($w(v_{a,b}, v_{a,a})$), sigmoid( ) is an S-type function, $v_{a,b}$ is the feature vector corresponding to the target subject a and the target subject b, $v_{a,a}$ is the feature vector corresponding to the target subject a, and w( ) is an inner product function.

In some possible implementations, the obtaining a panoramic semantic description based on the influencing factors includes:

extracting a first semantic description based on the location features;

extracting a second semantic description based on the attribute features and the first semantic description;

extracting a third semantic description based on the posture features and the second semantics; and extracting the panoramic semantic description based on the relational vector features and the third semantic description.

In some possible implementations, the first semantic description, the second semantic description, and the third semantic description are extracted by a same recurrent neural network (RNN).

According to a second aspect, an image analysis system including a feature extraction module and a panoramic semantic model is provided.

The feature extraction module is configured to obtain influencing factors of a panoramic semantic description. The influencing factors include self-owned features of h target subjects in each of t frames of images and relational vector features between the h target subjects in each of the t frames of images, the self-owned features include a location feature, an attribute feature, and a posture feature, where t and h are natural numbers greater than 1. The location feature is used to indicate a location of a corresponding target subject in the image. The attribute feature is used to indicate an attribute of the corresponding target subject. The posture feature is used to indicate an action of the corresponding target subject. The relational vector features are used to indicate relationships between target subjects.

The panoramic semantic model is configured to obtain the panoramic semantic description based on the influencing factors. The panoramic semantic description includes a description of the relationships between target subjects, relationships between the target subjects and actions, and relationships between the actions.

In some possible implementations, the feature extraction module includes a feature vector extraction unit, a location feature extraction unit, an attribute feature extraction unit, a posture feature extraction unit, and a relational vector feature unit.

The feature vector extraction unit is configured to extract features of the t frames of images to obtain t feature vectors.

The location feature extraction unit is configured to extract location features of the t feature vectors to obtain the location features.

The attribute feature extraction unit is configured to extract attribute features of the t feature vectors to obtain the attribute features.

The posture feature extraction unit is configured to extract posture features of the t feature vectors to obtain the posture features.

The relational vector feature unit is configured to extract relational vector features of the t feature vectors to obtain the relational vector features.

In some possible implementations, the feature extraction module includes a CNN. The feature vector extraction unit, the location feature extraction unit, the attribute feature extraction unit, the posture feature extraction unit, and the relational vector feature extraction unit are integrated into the CNN.

In some possible implementations, the relational vector feature extraction unit is configured to: perform region-of-interest pooling on a feature vector i based on a target subject a and a target subject b that are in an image i to obtain a feature vector $v_{a,b}$ corresponding to the target subject a and the target subject b, where i, a, and b are natural numbers, $0<i\leq t$, and $1\leq a,b\leq h$;

perform region-of-interest pooling based on the target subject a to obtain a feature vector $v_{a,a}$ corresponding to the target subject a; and calculate a relational vector feature $V^i_{ab}$ between the target subject a and the target subject b that are in the image i according to the following formula:

$$G_{a,b} = \frac{1}{\sum \|v_{a,b}\|} (w_{a,b}(v_{a,b}, v_{a,a})v_{a,b})$$

$w_{a,b}$=sigmoid($w(v_{a,b},v_{a,a})$), sigmoid( ) is an S-type function, $v_{a,b}$ is the feature vector corresponding to the target subject a and the target subject b, $v_{a,a}$ is the feature vector corresponding to the target subject a, and w( ) is an inner product function.

In some possible implementations, the panoramic semantic model includes a first time sequence feature extraction unit, a second time sequence feature extraction unit, a third time sequence feature extraction unit, and a fourth time sequence feature extraction unit.

The first time sequence feature extraction unit is configured to extract a first semantic description based on the location features.

The second time sequence feature extraction unit is configured to extract a second semantic description based on the attribute features and the first semantic description.

The third time sequence feature extraction unit is configured to extract a third semantic description based on the posture features and the second semantics.

The fourth time sequence feature extraction unit is configured to extract the panoramic semantic description based on the relational vector features and the third semantic description.

In some possible implementations, the panoramic semantic model includes a RNN. The first time sequence feature extraction unit, the second time sequence feature extraction unit, the third time sequence feature extraction unit, and the fourth time sequence feature extraction unit are respectively one layer in the RNN.

According to a third aspect, a compute node including a processor and a memory is provided. The processor is configured to:

obtain influencing factors of t frames of images, where the influencing factors include self-owned features of h target subjects in each of the t frames of images and relational vector features between the h target subjects in each of the t frames of images, self-owned features of each target subject include a location feature, an attribute feature, and a posture feature, t and h are natural numbers greater than 1, the location feature is used to indicate a location of a corresponding target subject in the image, the attribute feature is used to indicate an attribute of the corresponding target subject, the posture feature is used to indicate an action of the corresponding target subject, and the relational vector features are used to indicate relationships between target subjects; and obtain a panoramic semantic description based on the influencing factors, where the panoramic semantic description includes a description of the relationships between target subjects, relationships between actions of the target subjects and the target subjects, and relationships between the actions of the target subjects.

In the solution, the higher-level panoramic semantic description can be obtained based on location features, attribute features, and posture features of a plurality of target subjects in a plurality of frames of images and relational vector features between the plurality of target subjects in the plurality of frames of images, to better reflect relationships between the plurality of subjects, relationships between the subjects and actions, and relationships between the actions in the images.

In some possible designs, the processor is configured to:
extract features of the t frames of images to obtain t feature vectors;
extract location features of the t feature vectors to obtain the location features;
extract attribute features of the t feature vectors to obtain the attribute features;
extract posture features of the t feature vectors to obtain the posture features; and
extract relational vector features of the t feature vectors to obtain the relational vector features.

In some possible implementations, the location features, the attribute features, the posture features, and the relational vector features are extracted by a same CNN.

In the solution, the same CNN is used to extract the location features, the attribute features, the posture features, and the relational vector features. Therefore, when the location features, the attribute features, the posture features, and the relational vector features are extracted, previously extracted feature vectors may be used, to avoid extracting the vector features for a plurality of times, and reduce a calculation amount. In other words, there is no need to extract the feature vectors when the location features are extracted, extract the feature vectors when the attribute features are extracted, extract the feature vectors when the posture features are extracted, or extract the feature vectors when the relational vector features are extracted.

In some possible implementations, region-of-interest pooling is performed on a feature vector i based on a target subject a and a target subject b that are in an image i to obtain a feature vector $v_{a,b}$ corresponding to the target subject a and the target subject b, where i, a, and b are all natural numbers, $0<i \leq t$, $1 \leq a,b \leq h$, and the feature vector i is extracted based on the image i.

Region-of-interest pooling is performed based on the target subject a to obtain a feature vector $v_{a,a}$ corresponding to the target subject a.

A relational vector feature $V^i_{ab}$ between the target subject a and the target subject b that are in the image i is calculated according to the following formula:

$$G_{a,b} = \frac{1}{\sum \|v_{a,b}\|} (w_{a,b}(v_{a,b}, v_{a,a}) v_{a,b})$$

$w_{a,b}$=sigmoid($w(v_{a,b},v_{a,a})$), sigmoid( ) is an S-type function, $v_{a,b}$ is the feature vector corresponding to the target subject a and the target subject b, $v_{a,a}$ is the feature vector corresponding to the target subject a, and w( ) is an inner product function.

In some possible implementations, the processor is configured to:
extract a first semantic description based on the location features; extract a second semantic description based on the attribute features and the first semantic description;
extract a third semantic description based on the posture features and the second semantics; and
extract the panoramic semantic description based on the relational vector features and the third semantic description.

In some possible implementations, the first semantic description, the second semantic description, and the third semantic description are extracted by a same RNN.

According to a fourth aspect, a compute node cluster including at least one compute node is provided. Each compute node includes a processor and a memory. The processor executes code in the memory to perform the method according to any one of the first aspect.

According to a fifth aspect, a computer program product is provided. When the computer program product is read and executed by a computer, the method according to any one of the first aspect is performed.

According to a sixth aspect, a computer non-transient storage medium including an instruction is provided. When the instruction is run on at least one compute node in a compute node cluster, the compute node cluster is enabled to perform the method according to any one of the first aspect.

BRIEF DESCRIPTION OF DRAWINGS

To describe the solutions in embodiments or in the background more clearly, the following describes the accompanying drawings for describing the embodiments or the background.

DETAILED DESCRIPTION OF THE EMBODIMENTS

Terms used in embodiments are merely used to explain the embodiments but are non-limiting.

A single image used for a panoramic semantic description in the embodiments is first described in detail.

Figure 1A:
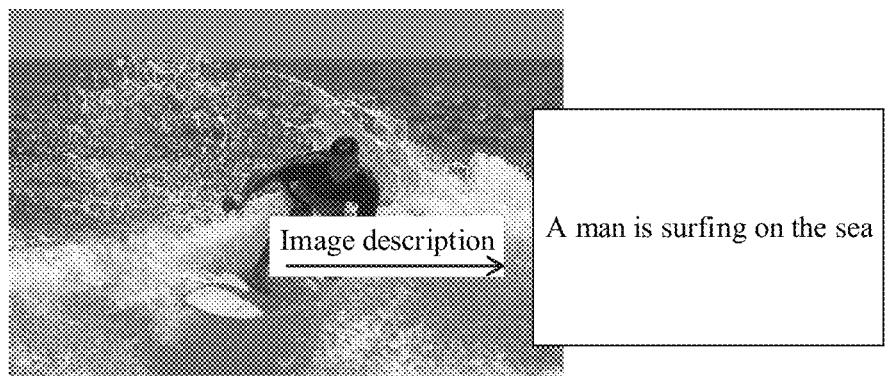
FIG. 1A is a schematic diagram of an image used for image descriptions.
Figure 1B:
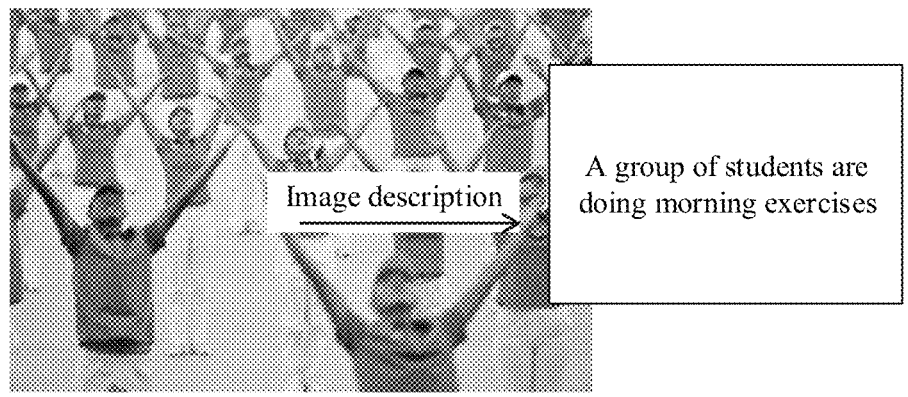
FIG. 1B is a schematic diagram of an image used for image descriptions.
Figure 1C:
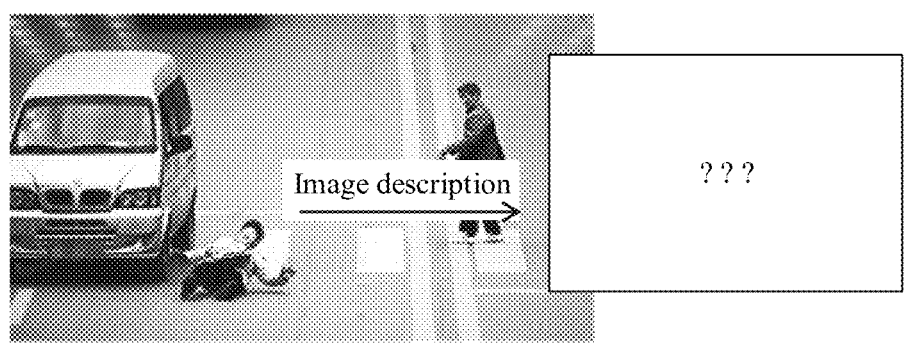
FIG. 1C is a schematic diagram of an image used for image descriptions.
Figure 2:
FIG. 2 is a schematic diagram of a single-frame image used for a panoramic semantic description according to an embodiment.

FIG. 2 is a schematic diagram of a single-frame image used for a panoramic semantic description according to an embodiment. In the embodiment, the single-frame image used for the panoramic semantic description may include a plurality of target subjects. The target subjects may be one or more of a person, an animal, an object, and the like. FIG. 2 is used as an example. The target subjects in the image shown in FIG. 2 include a man, a woman, and a vehicle. Different target subjects may perform different actions. The actions may be one or more of drinking water, reading a book, doing an exercise, playing basketball, playing football, running, swimming, and the like. FIG. 2 is used as an example. In the figure, an action of the man is looking toward the woman, an action of the woman is falling down, and an action of the vehicle in the figure is knocking the woman down. It may be understood that FIG. 2 is merely an example. In the embodiments, the target subject may be another subject, there may be more target subjects, and the action of the target subject may be another action or the like and are non-limiting.

Figure 3:
FIG. 3 is a schematic diagram of a plurality of frames of images used for a panoramic semantic description according to an embodiment.

In an embodiment, as shown in FIG. 3, an image analysis system may extract, from a video in a time sequence, t frames of images $I_1, I_2, \ldots,$ and $I_t$ used for a panoramic semantic description, where t is a natural number. The images $I_1, I_2, \ldots,$ and $I_t$ all include same target subjects. For example, the image $I_1$ includes a target subject 1, a target subject 2, and a target subject 3. The image $I_2$ includes the target subject 1, the target subject 2, and the target subject 3, . . . , and the image $I_t$ also includes the target subject 1, the target subject 2, and the target subject 3. It may be understood that time intervals between two adjacent frames of images in the t frames of images may be same or different and is non-limiting.

In an embodiment, the image analysis system may perform the panoramic semantic description on the image $I_t$ by using a panoramic semantic model. Input variables of the panoramic semantic model are influencing factors of the panoramic semantic description. The influencing factors of the panoramic semantic description include self-owned features (including location features, attribute features, and posture features) of target subjects in the images $I_1$ to $I_t$ and relational vector features between the target subjects in the images $I_1$ to $I_t$.

The location feature may be used to indicate a location of a corresponding target subject in the corresponding image. The location feature may be represented as (x, y, w, h), where x and y are a horizontal coordinate and a vertical coordinate of a central point of the target subject in the image, w is a width of the target subject in the image, and h is a height of the target subject in the image. The attribute feature is used to indicate an attribute of the corresponding target subject. The attribute feature may include a plurality of types of attribute features. Attribute features may be different if target subjects are different. For example, the target subject is a person. The attribute feature of the target subject may include one or more of a gender, a hairstyle, a clothes type, a clothes color, a height, a body size, and the like. The posture feature of the target subject is used to indicate an action of the corresponding target subject. The target subject also has a plurality of posture features. Posture features may be different if target subjects are different. For example, the target subject is a person. The posture feature of the target subject may include one or more of falling down, lying down, walking, running, jumping, and the like. The relational feature vector is a vector representing a relationship between two target subjects.

For example, each frame of image in the images $I_1, I_2, \ldots,$ and $I_t$ includes h target subjects. The influencing factors of the panoramic semantic description may include:

influencing factors, of a panoramic semantic description, obtained from the image $I_1$: self-owned features of h target subjects in the image $I_1$ and relational vector features between the h target subjects in the image $I_1$.

The self-owned features of the h target subjects in the image $I_1$ include:

$$\begin{bmatrix} P_1^1 & S_1^1 & Z_1^1 \\ P_2^1 & S_2^1 & Z_2^1 \\ \cdots & \cdots & \cdots \\ P_h^1 & S_h^1 & Z_h^1 \end{bmatrix}$$

Herein, a location feature $P_1^1$, an attribute feature $S_1^1$, and a posture feature $Z_1^1$ are self-owned features of a target subject 1 in the image $I_1$, a location feature $P_2^1$, an attribute feature $S_2^1$, and a posture feature $Z_2^1$ are self-owned features of a target subject 2 in the image $I_1$, . . . , and a location feature $P_h^1$, an attribute feature $S_h^1$, and a posture feature $Z_h^1$ are self-owned features of a target subject h in the image $I_1$.

The relational vector features between the h target subjects in the image $I_1$ include:

$$\begin{bmatrix} V_{12}^1 & V_{13}^1 & \cdots & V_{1h}^1 \\ & V_{23}^1 & \cdots & V_{1h}^1 \\ & & \vdots & \vdots \\ & & & V_{h-1h}^1 \end{bmatrix}$$

Herein, $V_{12}^1$ is a relational vector feature between the target subject 1 and the target subject 2 in the image $I_1$, $V_{13}^1$ is a relational vector feature between the target subject 1 and a target subject 3 in the image $I_1$, . . . , $V_{1h}^1$ is a relational vector feature between the target subject 1 and the target subject h in the image $I_1$, $V_{23}^1$ is a relational vector feature between the target subject 2 and the target subject 3 in the image $I_1$, . . . , $V_{2h}^1$ is a relational vector feature between the target subject 2 and the target subject h in the image $I_1$, . . . , and $V_{h-1h}^1$ is a relational vector feature between a target subject (h-1) and the target subject h in the image $I_1$.

The influencing factors of the panoramic semantic description may further include: influencing factors of, a panoramic semantic description, obtained from the image $I_2$: self-owned features of h target subjects in the image $I_2$ and relational vector features between the h target subjects in the image $I_2$.

The self-owned features of the h target subjects in the image $I_2$ include:

$$\begin{bmatrix} P_1^2 & S_1^2 & Z_1^2 \\ P_2^2 & S_2^2 & Z_2^2 \\ \cdots & \cdots & \cdots \\ P_h^2 & S_h^2 & Z_h^2 \end{bmatrix}$$

Herein, a location feature $P_1^2$, an attribute feature $S_1^2$, and a posture feature $Z_1^2$ are self-owned features of a target subject 1 in the image $I_2$, a location feature $P_2^2$, an attribute feature $S_2^2$, and a posture feature $Z_2^2$ are self-owned features of a target subject 2 in the image $I_2$, . . . , and a location feature $P_h^2$, an attribute feature $S_h^2$, and a posture feature $Z_h^2$ are self-owned features of a target subject h in the image $I_2$.

The relational vector features between the h target subjects in the image $I_2$ include:

$$\begin{bmatrix} V_{12}^2 & V_{13}^2 & \cdots & V_{1h}^2 \\ & V_{23}^2 & \cdots & V_{2h}^2 \\ & & \vdots & \vdots \\ & & & V_{h-1h}^2 \end{bmatrix}$$

Herein, $V_{12}^2$ is a relational vector feature between the target subject 1 and the target subject 2 in the image $I_2$, $V_{13}^2$ is a relational vector feature between the target subject 1 and a target subject 3 in the image $I_2$, ..., $V_{1h}^2$ is a relational vector feature between the target subject 1 and the target subject h in the image $I_2$, $V_{23}^2$ is a relational vector feature between the target subject 2 and the target subject 3 in the image $I_2$, $V_{2h}^2$ is a relational vector feature between the target subject 2 and the target subject h in the image $I_2$, ..., and $V_{h-1h}^2$ is a relational vector feature between a target subject (h-1) and the target subject h in the image $I_2$.

The influencing factors of the panoramic semantic description may further include: influencing factors, of a panoramic semantic description, obtained from the image $I_t$: self-owned features of h target subjects in the image $I_t$ and relational vector features between the h target subjects in the image $I_t$.

The self-owned features of the h target subjects in the image $I_t$ include:

$$\begin{bmatrix} P_1^t & S_1^t & Z_1^t \\ P_2^t & S_2^t & Z_2^t \\ \cdots & \cdots & \cdots \\ P_h^t & S_h^t & Z_h^t \end{bmatrix}$$

Herein, a location feature $P_1^t$, an attribute feature $S_1^t$, and a posture feature $Z_1^t$ are self-owned features of a target subject 1 in the image $I_t$, a location feature $P_2^t$, an attribute feature $S_2^t$, and a posture feature $Z_2^t$ are self-owned features of a target subject 2 in the image $I_t$, ..., and a location feature $P_h^t$, an attribute feature $S_h^t$, and a posture feature $Z_h^t$ are self-owned features of a target subject h in the image $I_t$.

The relational vector features between the h target subjects in the image $I_t$ include:

$$\begin{bmatrix} V_{12}^t & V_{13}^t & \cdots & V_{1h}^t \\ & V_{23}^t & \cdots & V_{2h}^t \\ & & \vdots & \vdots \\ & & & V_{h-1h}^t \end{bmatrix}$$

Herein, $V_{12}^t$ is a relational vector feature between the target subject 1 and the target subject 2 in the image $I_t$, $V_{13}^t$ is a relational vector feature between the target subject 1 and a target subject 3 in the image $I_t$, ..., $V_{1h}^t$ is a relational vector feature between the target subject 1 and the target subject h in the image $I_t$, $V_{23}^t$ is a relational vector feature between the target subject 2 and the target subject 3 in the image $I_t$, ..., $V_{2h}^t$ is a relational vector feature between the target subject 2 and the target subject h in the image $I_t$, ..., and $V_{h-1h}^t$ is a relational vector feature between a target subject (h-1) and the target subject h in the image $I_t$.

It may be understood that the example of the influencing factors of the panoramic semantic description is merely used as an example. The influencing factors of the panoramic semantic description may further include other influencing factors and is non-limiting.

In an exemplary embodiment, location features, attribute features, and posture features of the target subjects in the images $I_1, I_2, \ldots,$ and $I_t$ and relational vector features between the target subjects in the images $I_1, I_2, \ldots,$ and $I_t$ may be separately calculated based on feature vectors $V_1, V_2, \ldots,$ and $V_t$ of the images $I_1, I_2, \ldots,$ and $V_t$. In other words, location features, attribute features, and posture features of target subjects in the image $I_1$ and relational vector features between the target subjects in the image $I_1$ may be calculated based on the feature vector $V_1$ of the image $I_1$, location features, attribute features, and posture features of target subjects in the image $I_2$ and relational vector features between the target subjects in the image $I_2$ may be calculated based on the feature vector $V_2$ of the image $I_2$, ..., and location features, attribute features, and posture features of target subjects in the image $I_t$ and relational vector features between the target subjects in the image $I_t$ may be calculated based on the feature vector $V_t$ of the image $I_t$.

Figure 4:
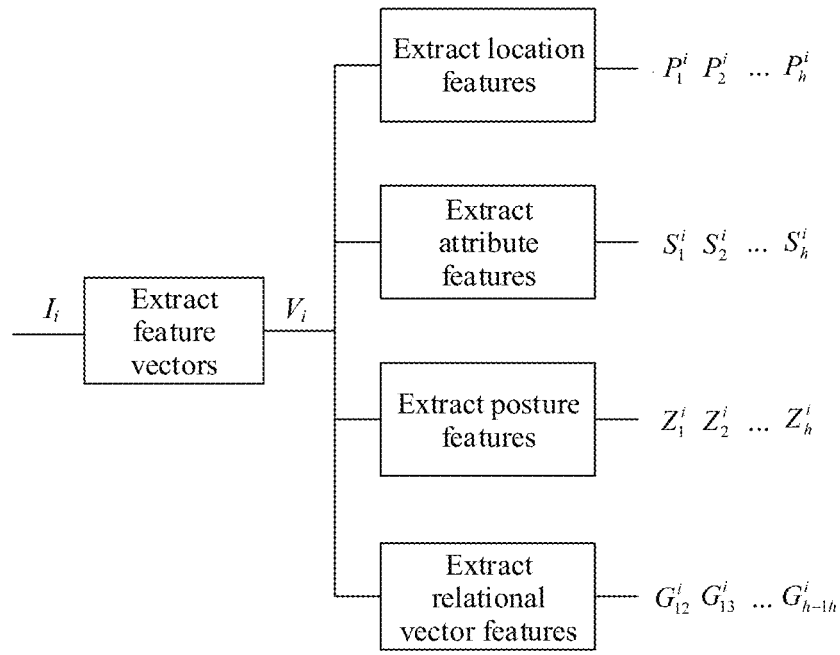
FIG. 4 is a schematic diagram of feature extraction of location features, attribute features, posture features, and relational vector features.

As shown in FIG. 4, feature vectors $V_1, V_2, \ldots,$ and $V_t$ of images $I_1, I_2, \ldots,$ and $I_t$ may be obtained in this way. An image $I_i$ is used as an example. The image $I_i$ may be input into a feature vector extraction unit to obtain a feature vector $V_i$ of the image $I_i$, where i is a natural number, and $1 \le i \le t$. The feature vector extraction unit may sequentially include an input layer, a convolution compute layer, a pooling layer, and a fully connected layer.

The input layer:

It is assumed that input of the input layer is the image $I_i$, and output is equal to the input. In other words, no processing is performed on the input. For ease of description, it is assumed herein that there is no processing in the input layer. However, processing such as normalization may be performed in the input layer.

The convolution compute layer:

The image $I_i$ output by the input layer is used as input of the convolution compute layer, and is convolved by n convolution kernels $K_l$ ($l=1, 2, \ldots, n$) to generate n feature images $a_l$ ($l=1, 2, \ldots, n$). A process of generating each feature image $a_l$ is specifically as follows:

$$C_l = conv2(I, K_l, 'valid',) + b_l$$
$$u_l = C_l$$
$$a_l = f(u_l)$$

conv represents performing a convolution operation on the image I by using a convolution kernel $K_l$, valid represents a padding manner, $b_l$ represents an offset value, $u_l$ represents a convolution calculation result, and f( ) represents an activation function such as a relu function.

The pooling layer:

The n feature images $a_l$ output by the convolution compute layer are used as input of the pooling layer, and after pooling is performed by using a pooling window, n pooled images $b_l$ ($l=1, 2, \ldots, n$) are generated. A generation process of each pooled image $b_l$ is specifically as follows:

$$b_l = \text{max Pool}(a_l)$$

maxPool represents average pooling.

The fully connected layer:

The n pooled images $b_l$ (l=1, 2, ..., n) are sequentially expanded into a vector, and are sequentially connected into a long vector. The long vector is used as input of the fully connected layer network. Output of the fully connected layer is the feature vector $V_i$ of the image $I_i$.

The parameters in the feature vector extraction unit, the convolution kernel $K_l$ (including an element, a size, a step size, and the like), the offset value $b_l$, f( ) and $\beta_l$ may be manually set based on a feature (a location feature, an attribute feature, a posture feature, and a relational vector feature) that needs to be extracted, a size of the image $I_i$, and the like. The convolution kernel $K_l$ is used as an example. When the feature that needs to be extracted is the location feature, the element of the convolution kernel $K_l$ may be an element of a sobel operator. For another example, when the image $I_i$ is relatively large, the size of the convolution kernel $K_l$ may be relatively large. On the contrary, when the image $I_i$ is relatively small, the size of the convolution kernel $K_l$ may be relatively small. For another example, when the image $I_i$ is relatively large, the step size of the convolution kernel $K_l$ may also be relatively large. On the contrary, when the image $I_i$ is relatively small, the step size of the convolution kernel $K_l$ may also be relatively small.

It may be understood that the feature vector extraction unit is merely used as an example. The feature vector extraction unit may alternatively be in another form. For example, the feature vector extraction unit may include more convolution compute layers and more pooling layers, and may fill the image $I_i$, and the like.

For brevity, the foregoing describes only extraction of the feature vector $V_i$ of the image $I_i$. Actually, extraction manners of the feature vectors $V_1, V_2, \ldots,$ and $V_t$ of the images $I_1, I_2, \ldots,$ and $I_t$ are similar to the extraction manner of the feature vector $V_i$ of the image $I_i$. Details are not described herein again.

As shown in FIG. 4, location features of target subjects in the images $I_1, I_2, \ldots,$ and $I_t$ may be obtained in this way. The image $I_i$ is used as an example. It may be assumed that the image $I_i$ includes the h target subjects. The feature vector $V_i$ is input into a location feature extraction unit for extraction to obtain location features $P_1^i, P_2^i, \ldots,$ and $P_h^i$ of the h target subjects in the image $I_i$, where i is a natural number, and $1 \leq i \leq t$. The location feature extraction unit may be represented as:

$$y_1 = g_1(x_1).$$

Herein, $x_1$ may be the feature vector $V_i$ of the image $I_i$, $y_1$ may be the location features $P_1^i, P_2^i, \ldots,$ and $P_h^i$ of the h target subjects in the image $I_i$, $g_1()$ is a mapping relationship between the feature vector $V_i$ and the location features $P_1^i, P_2^i, \ldots,$ and $P_h^i$, and $g_1()$ may be obtained by training a large quantity of known images and location features of known target subjects. For brevity, the foregoing describes only extraction of the location features $P_1^i, P_2^i, \ldots$ and $P_h^i$ of the h target subjects in the image $I_i$. Actually, extraction manners of location features $P_1^1, P_2^1, \ldots,$ and $P_h^1, P_1^2, P_2^2, \ldots,$ and $P_h^2, \ldots,$ and $P_1^t, P_2^t, \ldots,$ and $P_h^t$ of h target subjects in each of the images $I_1, I_2, \ldots,$ and $I_t$ are similar to the extraction manner of the location features $P_1^i, P_2^i, \ldots,$ and $P_h^i$ of the h target subjects in the image $I_i$. Details are not described herein again.

As shown in FIG. 4, attribute features of the target subjects in the images $I_1, I_2, \ldots,$ and $I_t$ may be obtained in this way. The image $I_i$ is used as an example. It is assumed that the image $I_i$ includes the h target subjects. The feature vector $V_i$ is input into an attribute feature extraction unit for extraction to obtain attribute features $S_1^i, S_2^i, \ldots,$ and $S_h^i$ of the h target subjects in the image $I_i$, where i is a natural number, and $1 \leq i \leq t$. The attribute extraction unit may be represented as:

$$y_2 = g_2(x_1)$$

Herein, $x_1$ may be the feature vector $V_i$ of the image $I_i$, $y_2$ may be the attribute features $S_1^i, S_2^i, \ldots,$ and $S_h^i$ of the h target subjects in the image $I_i$, $g_2()$ is a mapping relationship between the feature vector $V_i$ and the attribute features $S_1^i, S_2^i, \ldots,$ and $S_h^i$, and $g_2()$ may be obtained by training a large quantity of known images and attribute features of known target subjects. For brevity, the foregoing describes only extraction of the attribute features $S_1^i, S_2^i, \ldots,$ and $S_h^i$ of the h target subjects in the image $I_i$. Actually, extraction manners of attribute features $S_1^1, S_2^1, \ldots,$ and $S_h^1, S_1^2, S_2^2, \ldots,$ and $S_h^2, \ldots,$ and $S_1^t, S_2^t, \ldots,$ and $s_h^t$ of h target subjects in each of the images $I_1, I_2, \ldots,$ and $I_t$ are similar to the extraction manner of the attribute features $S_1^i, S_2^i, \ldots,$ and $S_h^i$ of the h target subjects in the image $I_i$. Details are not described herein again.

As shown in FIG. 4, posture features of the target subjects in the images $I_1, I_2, \ldots,$ and $I_t$ may be obtained in this way. The image $I_i$ is used as an example. It is assumed that the image $I_i$ includes the h target subjects. The feature vector $V_i$ is input into a posture extraction unit for extraction to obtain posture features $Z_1^i, Z_2^i, \ldots,$ and $Z_h^i$ of the h target subjects in the image $I_i$, where i is a natural number, and $1 \leq i \leq t$. The posture extraction unit may be represented as:

$$y_3 = g_3(x_1).$$

Herein, $x_1$ may be the feature vector $V_i$ of the image $I_i$, $y_3$ may be the posture features $Z_1^i, Z_2^i, \ldots,$ and $Z_h^i$ of the h target subjects in the image $I_i$, $g_3()$ is a mapping relationship between the feature vector $V_i$ and the posture features $Z_1^i, Z_2^i, \ldots,$ and 4, and $g_2()$ may be obtained by training a large quantity of known images and posture features of known target subjects. For brevity, the foregoing describes only extraction of the posture features $Z_1^i, Z_2^i, \ldots,$ and $Z_h^i$ of the h target subjects in the image $I_i$. Actually, extraction manners of posture features $Z_1^1, Z_2^1, \ldots,$ and $Z_h^1, Z_1^2, Z_2^2, \ldots,$ and $Z_h^2, \ldots,$ and $Z_1^t, Z_2^t, \ldots,$ and $Z_h^t$ of h target subjects in each of the images $I_1, I_2, \ldots,$ and $I_t$ are similar to the extraction manner of the posture features $Z_1^i, Z_2^i, \ldots,$ and $Z_h^i$ of the h target subjects in the image $I_i$. Details are not described herein again.

As shown in FIG. 4, relational vector feature between the target subjects in the images $I_1, I_2, \ldots,$ and $I_t$ may be obtained in this way. The image $I_i$ is used as an example. It is assumed that the image $I_i$ includes the h target subjects. Relational vector features between the h target subjects in the image $I_i$ include: $G_{12}^i, G_{13}^i, \ldots,$ and $G_{1h}^i; G_{23}^i, \ldots,$ and $G_{2h}^i; \ldots;$ and $G_{h-1h}^i$. A relational feature vector $G_{ab}^i$ may be calculated by a relational vector feature extraction unit, where i, a, and b are natural numbers, $1 \leq i \leq t$ and $1 \leq a, b \leq h$.

The relational vector feature extraction unit is configured to perform region-of-interest pooling (ROI) based on a target subject a and a target subject b to obtain a feature vector $v_{a,b}$, corresponding to the target subject a and the target subject b.

The relational vector feature extraction unit is configured to perform ROI pooling based on the target subject a to obtain a feature vector $v_{a,a}$ corresponding to the target subject a.

The relational vector feature extraction unit is configured to calculate the relational vector feature $V_{ab}^i$ according to the following formula:

$$G_{a,b} = \frac{1}{\sum \|v_{a,b}\|}(w_{a,b}(v_{a,b}, v_{a,a})v_{a,b})$$

$w_{a,b}$=sigmoid($w(v_{a,b}, v_{a,a})$), sigmoid( ) is an S-type function, $v_{a,b}$ is the feature vector corresponding to the target subject a and the target subject b, $v_{a,a}$ is the feature vector corresponding to the target subject a, w( ) is an inner product function, and $w_{a,b}$ may be obtained by training a large quantity of known target subjects and known feature vectors.

For brevity, the foregoing describes only extraction of the relational vector features $G_{12}^i, G_{13}^i, \ldots,$ and $G_{h-1h}^i$ of the h target subjects in the image $I_i$. Extraction manners of relational vector features $G_{12}^1, G_{13}^1, \ldots, G_{h-1h}^1, G_{12}^2, G_{13}^2, \ldots,$ and $G_{h-1h}^2, \ldots,$ and $G_{12}^t, G_{13}^t, \ldots,$ and $G_{h-1h}^t$ of h target subjects in each of the images $I_1, I_2, \ldots,$ and $I_t$ are similar to the extraction manner of the relational vector features $G_{12}^i, G_{13}^i, \ldots,$ and $G_{h-1h}^i$ of the h target subjects in the image $I_i$. Details are not described herein again.

Extraction of the feature vectors, the location features, the attribute features, the posture features, and the relational vector features may be implemented separately by different CNN, or may be integrated into a same CNN for implementation and is non-limiting. The CNN may include a VGG-Net, a ResNet, an FPNet, and the like. When the extraction of the feature vectors, the location features, the attribute features, the posture features, and the relational vector features is integrated into the same CNN for completion, the extraction of the feature vectors, the location features, the attribute features, the posture features, and the relational vector features may be implemented separately at different layers in the CNN.

In an exemplary embodiment, influencing factors of a panoramic semantic description (the location features of the target subjects in the images $I_1, I_2, \ldots,$ and $I_t$, the attribute features of the target subjects in the images $I_1, I_2, \ldots,$ and $I_t$, the posture features of the target subjects in the images $I_1, I_2, \ldots,$ and $I_t$, and the relational vector features between the target subjects in the images $I_1, I_2, \ldots,$ and $I_t$) have the following influences on the panoramic semantic description: The location features of the target subjects in the images $I_1, I_2, \ldots,$ and $I_t$ may provide a first semantic description about locations of the target subjects. The attribute features of the target subjects in the images $I_1, I_2, \ldots,$ and $I_t$ and the first semantic description may be used to obtain a second semantic description of attributes of the target subjects. The posture features of the target subjects in the images $I_1, I_2, \ldots,$ and $I_t$ and the second semantic description may be used to obtain a third semantic description. Finally, the relational vector features between the target subjects of the images $I_1, I_2, \ldots,$ and $I_t$ and the third semantic description may be used to obtain the panoramic semantic description.

An example shown in FIG. 3 is used as an example. The influencing factors of the panoramic semantic description have the following influences on the panoramic semantic description: First, a first semantic description "an object A and an object B are on the left side of an object C" may be obtained by using location features of each of a man, a woman, and a vehicle that are in the images $I_1, I_2, \ldots,$ and $I_t$ in FIG. 3. Then, a second semantic description "the woman and the vehicle are on the left side of the man" may be obtained by using attribute features of the man, the woman, and the vehicle that are in the images $I_1, I_2, \ldots,$ and $I_t$ in FIG. 3 and the first semantic description. Then, a third semantic description may be obtained by using posture features of the man, the woman, and the vehicle that are in the images $I_1, I_2, \ldots,$ and $I_t$ in FIG. 3 and the second semantic description. Finally, the panoramic semantic description "the man on the right sees that the woman on the left is knocked down by the vehicle" may be obtained by using relational vector features in the images $I_1, I_2, \ldots,$ and $I_t$ in FIG. 3 and the third semantic description.

It may be understood that the example shown in FIG. 3 is merely used as an example. In another embodiment, the panoramic semantic description may be further performed on another image.

Figure 5:
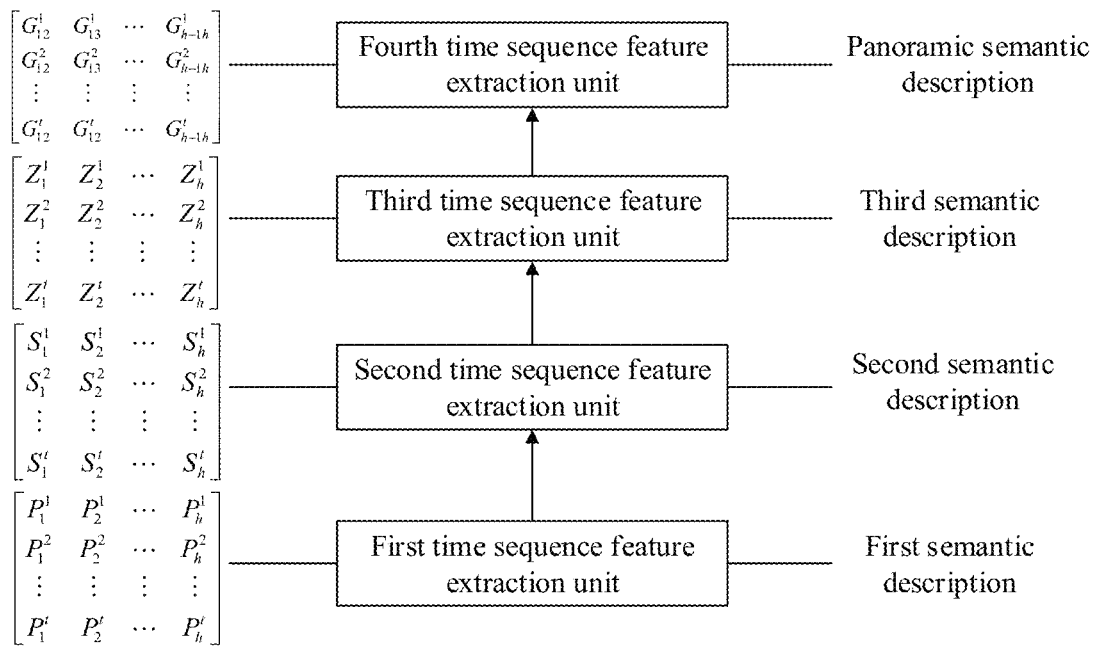
FIG. 5 is a schematic diagram of a panoramic semantic model according to an embodiment.

In an embodiment, a panoramic semantic model may be represented as:

$$y = \text{Panorama}(x).$$

x is the influencing factors of the panoramic semantic description, y is the panoramic semantic description, Panorama( ) is a mapping relationship between the influencing factors of the panoramic semantic description and the panoramic semantic description, and Panorama( ) may be obtained by training a large quantity of influencing factors of known panoramic semantic descriptions and the known panoramic semantic descriptions. In an exemplary embodiment, a panoramic semantic model may be shown in FIG. 5.

Location features $P_1^1, P_2^1, \ldots,$ and $P_h^1, P_1^2, P_2^2, \ldots,$ and $P_h^2, \ldots,$ and $P_1^t, P_2^t, \ldots,$ and $P_h^t$ of h target subjects in images $I_1, I_2, \ldots,$ and $I_t$ are input into a time sequence feature extraction unit 1 to obtain a first semantic description.

Attribute features $S_1^1, S_2^1, \ldots,$ and $S_h^1, S_1^2, S_2^2, \ldots,$ and $S_h^2, \ldots,$ and $S_1^t, S_2^t, \ldots,$ and $S_h^t$ of the h target subjects in the images $I_1, I_2, \ldots,$ and $I_t$ and the first semantic description are input into a time sequence feature extraction unit 2 to obtain a second semantic description.

Posture features $Z_1^1, Z_2^1, \ldots,$ and $Z_h^1, Z_1^2, Z_2^2, \ldots,$ and $Z_h^2, \ldots,$ and $Z_1^t, Z_2^t, \ldots,$ and $Z_h^t$ of the h target subjects in the images $I_1, I_2, \ldots,$ and $I_t$ and the second semantic description are input into a time sequence feature extraction unit 3 to obtain a third semantic description.

Relational vector features $V_{12}^1, V_{13}^1, \ldots,$ and $V_{h-1h}^1, V_{12}^2, V_{13}^2, \ldots,$ and $V_{h-1h}^2, \ldots,$ and $V_1^t, V_2^t, \ldots,$ and $V_h^t$ of the h target subjects in the images $I_1, I_2, \ldots,$ and $I_t$ and the third semantic description are input into a time sequence feature extraction unit 4 to obtain a panoramic semantic description.

It may be understood that extraction of the first semantic description, the second semantic description, the third semantic description, and the panoramic semantic description may be implemented separately by different RNN, or may be implemented by a same RNN. The RNN may include a long short-term memory (LSTM) model, a bidirectional LSTM (BiLSTM) model, and the like. When the extraction of the first semantic description, the second semantic description, the third semantic description, and the panoramic semantic description is implemented in the same RNN, the extraction may be implemented separately at different layers in the RNN.

Figure 6A:
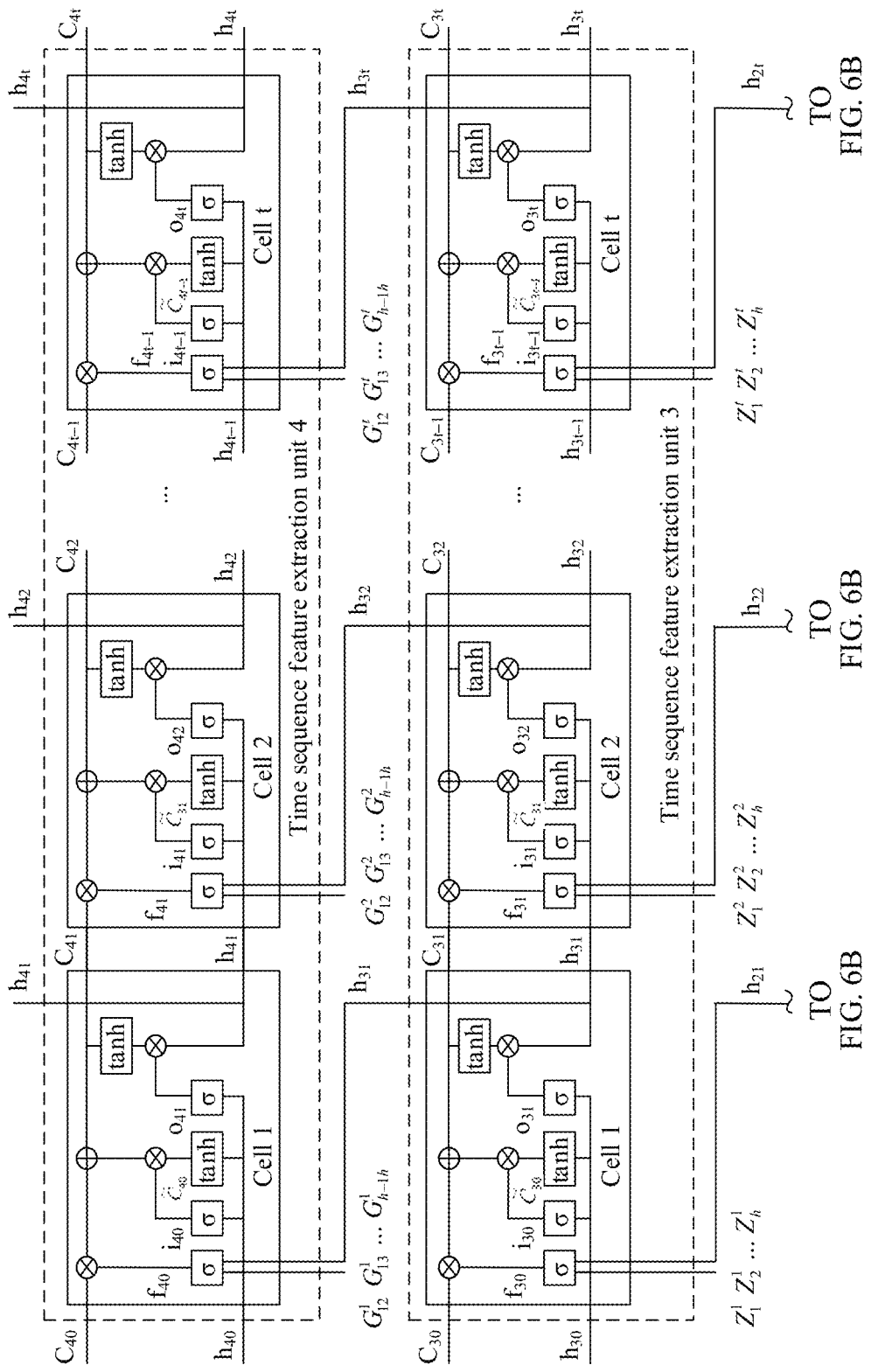
FIG. 6A is a schematic diagram of a panoramic semantic model according to another embodiment.
Figure 6B:
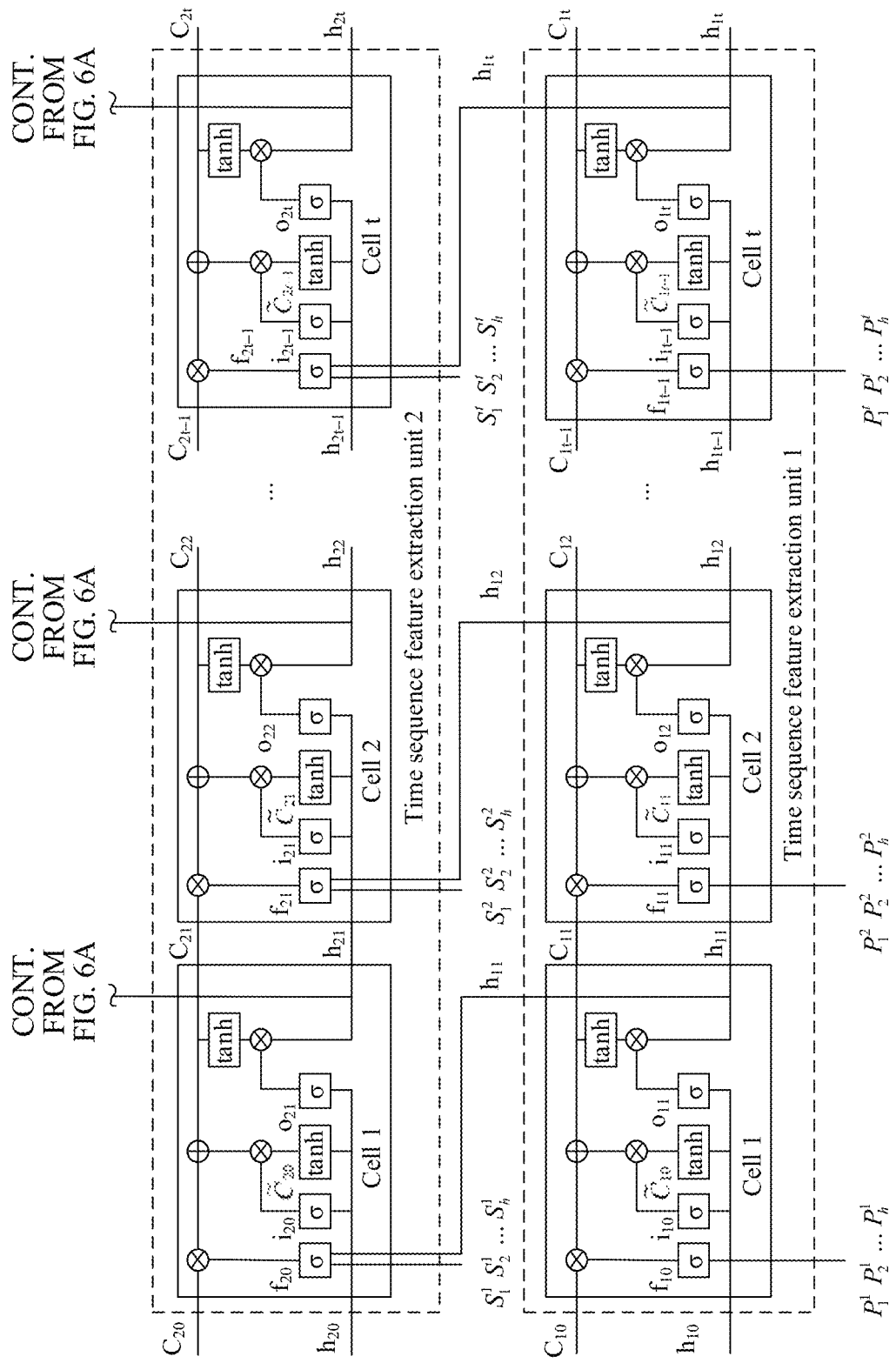
FIG. 6B is a schematic diagram of a panoramic semantic model according to another embodiment.

For example, time sequence feature extraction units 1 to 4 are all LSTMs. In a embodiment, a panoramic semantic model may be shown in FIG. 6A and FIG. 6B.

The following provides calculation processes in a neuron 1, a neuron 2, . . . , and a neuron t in the first time sequence feature extraction unit.

In the neuron 1:

First, a forgotten value $f_{10}$ is calculated based on location features $P_1^1, P_2^1, \ldots,$ and $P_h^1$ of h target subjects in an image $I_1$ and an initial output value $h_{10}$:

$$f_{10}=\sigma(W_{10}^f \cdot [h_{10},[P_1^1,P_2^1,\ldots P_h^1]]+b_{10}^f).$$

$\sigma(\ )$ is a sigmoid function, $b_{10}^f$ is an offset value, and $W_{10}^f$ is a weight matrix.

Then, an input value $C_{11}$ is calculated based on the location features $P_1^1, P_2^1, \ldots,$ and $P_h^1$ of the h target subjects in the image $I_1$, an initial input value $C_{10}$, the initial output value $h_{10}$, and the forgotten value $f_{10}$:

$$i_{10}=\sigma(W_{10}^i \cdot [h_{10},[P_1^1,P_2^1,\ldots P_h^1]]+b_{10}^i)$$

$$\tilde{C}_{10}=\tanh(W_{10}^c \cdot [h_{10},[P_1^1,P_2^1,\ldots P_h^1]]+b_{10}^c)$$

$$C_{11}=f_{10}*C_{10}+i_{10}*\tilde{C}_{10}$$

$\sigma(\ )$ is a sigmoid function, tanh is an activation function, both $W_{10}^i$ and $W_{10}^c$ are weight matrices, and both $b_{10}^i$ and $b_{10}^c$ are offset values.

Finally, an output value $h_{11}$ is calculated based on the location features $P_1^1, P_2^1, \ldots,$ and $P_h^1$ of the h target subjects in the image $I_1$, the initial output value $h_{10}$ and the input value $C_{11}$:

$$o_{10}=\sigma(W_{10}^o \cdot [h_{10},[P_1^1,P_2^1,\ldots P_h^1]]+b_{10}^o)$$

$$h_{11}=o_{10}\tanh(C_{11})$$

$\sigma(\ )$ is a sigmoid function, tanh is an activation function, $W_{10}^o$ is a weight matrix, and $b_{10}^o$ is an offset value.

In the neuron 2:

First, a forgotten value $f_{11}$ is calculated based on location features $P_1^2, P_2^2, \ldots,$ and $P_h^2$ of h target subjects in an image $I_2$ and the output value $h_{11}$;

$$f_{11}=\sigma(W_{11}^f \cdot [h_{11},[P_1^2,P_2^2,\ldots P_h^2]]+b_{11}^f)$$

$\sigma(\ )$ is a sigmoid function, $b_{11}^f$ is an offset value, and $W_{11}^f$ a weight matrix.

Then, an input value $C_{12}$ is calculated based on the location features $P_1^2, P_2^2, \ldots,$ and $P_h^2$ of the h target subjects in the image $I_2$ an input value $C_{11}$, the output value $h_{11}$, and the forgotten value f:

$$i_{11}=\sigma(W_{11}^i \cdot [h_{11},[P_1^2,P_2^2,\ldots P_h^2]]+b_{11}^i)$$

$$\tilde{C}_{11}=\tanh(W_{11}^c \cdot [h_{11},[P_1^2,P_2^2,\ldots P_h^2]]+b_{11}^c)$$

$$C_{12}=f_{11}*C_{11}+i_{11}*\tilde{C}_{11}$$

$\sigma(\ )$ is a sigmoid function, tanh is an activation function, both $W_{11}^i$ and $W_{11}^c$ are weight matrices, and both $b_{11}^i$ and $b_{11}^c$ are offset values.

Finally, an output value $h_{12}$ is calculated based on the location features $P_1^2, P_2^2, \ldots,$ and $P_h^2$ of the h target subjects in the image $I_2$, the output value $k_1$ and the input value $C_{12}$:

$$o_{11}=\sigma(W_{11}^o \cdot [h_{11},[P_1^2,P_2^2,\ldots P_h^2]]+b_{11}^o)$$

$$h_{12}=o_{11}\tanh(C_{12})$$

$\sigma(\ )$ is a sigmoid function, tanh is an activation function, $W_{11}^o$ is a weight matrix, and $b_{11}^o$ is an offset value.

In the neuron t:

First, a forgotten value $f_{1t-1}$ is calculated based on location features $P_1^t, P_2^t, \ldots,$ and $P_h^t$ of h target subjects in an image $I_t$ and an output value $h_{1t-1}$:

$$f_{1t-1}=\sigma(W_{1t-1}^f \cdot [h_{1t-1},[P_1^t,P_2^t,\ldots P_h^t]]+b_{1t-1}^f)$$

$\sigma(\ )$ is a sigmoid function, $b_{1t-1}^f$ is an offset value, and $W_{1t-1}^f$ is a weight matrix.

Then, an input value $C_{1t}$ is calculated based on the location features $P_1^t, P_2^t, \ldots,$ and $P_h^t$ of the h target subjects in the image $I_t$, an input value $C_{1t-i}$, the output value $h_{1t-1}$, and the forgotten value $f_{1t-1}$:

$$i_{1t-1}=\sigma(W_{1t-1}^i \cdot [h_{1t-1},[P_1^t,P_2^t,\ldots P_h^t]]+b_{1t-1}^i)$$

$$\tilde{C}_{1t-1}=\tanh(W_{1t-1}^c \cdot [h_{1t-1},[P_1^t,P_2^t,\ldots P_h^t]]+b_{1t-1}^c)$$

$$C_{1t}=f_{1t-1}*C_{1t-1}+i_{1t-1}*\tilde{C}_{1t-1}$$

$\sigma(\ )$ is a sigmoid function, tanh is an activation function, both $W_{1t-1}^i$ and $W_{1t-1}^c$ are weight matrices, and both $b_{1t-1}^i$ and $b_{1t-1}^c$ are offset values.

Finally, an output value $h_{1t}$ is calculated based on the location features $P_1^t, P_2^t, \ldots,$ and $P_h^t$ of the h target subjects in the image $I_t$, the output value $h_{1t-1}$ and the input value $C_{1t}$:

$$o_{1t-1}=\sigma(W_{1t-1}^o \cdot [h_{1t-1},[P_1^t,P_2^t,\ldots P_h^t]]+b_{1t-1}^o)$$

$$h_{1t}=o_{1t-1}\tanh(C_{1t})$$

$\sigma(\ )$ is a sigmoid function, tanh is an activation function, $W_{1t-1}^o$ is a weight matrix, and $b_{1t-1}^o$ is an offset value.

The foregoing $h_{11}$ to $h_{1t}$ may constitute a first semantic description.

It may be understood that the initial output value $h_{10}$, offset values $b_{10}^f$ to $b_{1t-1}^f$, offset values $b_{10}^i$ to $b_{1t-1}^i$, offset values $b_{10}^c$ to $b_{1t-1}^c$, and offset values $b_{10}^o$ to $b_{1t-1}^o$ may be manually set. Weight matrices $W_{10}^f$ to $W_{1t-1}^f$, weight matrices $W_{10}^i$ to $W_{1t-1}^i$, weight matrices $W_{10}^c$ to $W_{1t-1}^c$ may be obtained by training a large quantity of known first semantic descriptions and location features of known target subjects.

The following provides calculation processes in a neuron 1, a neuron 2, ..., and a neuron t in the second time sequence feature extraction unit.

In the neuron 1:

First, a forgotten value $f_{20}$ is calculated based on attribute features $S_1^1, S_2^1, \ldots,$ and $S_h^1$ of the h target subjects in the image $I_1$ and an initial output value $h_{20}$:

$$f_{20}=\sigma(W_{20}^f \cdot [h_{20},[S_1^1,S_2^1,\ldots S_h^1]]+b_{20}^f)$$

$\sigma(\ )$ is a sigmoid function, $b_{20}^f$ is an offset value, and $W_{20}^f$ is a weight matrix.

Then, an input value $C_{21}$ is calculated based on the attribute features $S_1^1, S_2^1,$ and $S_h^1$ of the h target subjects in the image $I_1$, an initial input value $C_{20}$, the initial output value $h_{20}$, and the forgotten value $f_{20}$:

$$i_{20}=\sigma(W_{20}^i \cdot [h_{20},[S_1^1,S_2^1,\ldots S_h^1]]+b_{20}^i)$$

$$\tilde{C}_{20}=\tanh(W_{20}^c \cdot [h_{20},[S_1^1,S_2^1,\ldots S_h^1]]+b_{20}^c)$$

$$C_{21}=f_{20}*C_{20}+i_{20}*\tilde{C}_{20}$$

$\sigma(\ )$ is a sigmoid function, tanh is an activation function, both $W_{20}^i$ and $W_{20}^c$ are weight matrices, and both $b_{20}^i$ and $b_{20}^c$ are offset values.

Finally, an output value $h_{21}$ is calculated based on the attribute features $S_1^1, S_2^1, \ldots,$ and $S_h^1$ of the h target subjects in the image $I_1$, the initial output value $h_{20}$ and the input value $C_{21}$:

$$o_{20}=\sigma(W_{20}^o \cdot [h_{20},[S_1^1,S_2^1,\ldots S_h^1]]+b_{20}^o)$$

$$h_{21}=o_{20}\tanh(C_{21})$$

$\sigma(\ )$ is a sigmoid function, tanh is an activation function, $W_{20}^o$ is a weight matrix, and $b_{20}^o$ is an offset value.

In the neuron 2:

First, a forgotten value $f_{21}$ is calculated based on attribute features $S_1^2, S_2^2, \ldots,$ and $S_h^2$ of the h target subjects in the image $I_2$ and the output value $h_{21}$:

$$f_{21}=\sigma(W_{21}^f \cdot [h_{21},[S_1^2,S_2^2,\ldots S_h^2]]+b_{21}^f)$$

$\sigma(\ )$ is a sigmoid function, $b_{21}^f$ is an offset value, and $W_{21}^f$ is a weight matrix.

Then, an input value $C_{22}$ is calculated based on the attribute features $S_1^2, S_2^2, \ldots,$ and $S_h^2$ of the h target subjects in the image $I_2$, an input value $C_{21}$, the output value $h_{21}$, and the forgotten value $f_{21}$:

$$i_{21}=\sigma(W_{31}^i \cdot [h_{21},[S_1^2,S_2^2,\ldots S_h^2]]+b_{21}^i)$$

$$\tilde{C}_{21}=\tanh(W_{21}^c \cdot [h_{21},[S_1^2,S_2^2,\ldots S_h^2]]+b_{21}^c)$$

$$C_{22}=f_{21}*C_{21}+i_{21}*\tilde{C}_{21}$$

$\sigma(\ )$ is a sigmoid function, tanh is an activation function, both $W_{21}^i$ and $W_{21}^c$ are weight matrices, and both $b_{21}^i$ and $b_{21}^c$ are offset values.

Finally, an output value $h_{12}$ is calculated based on the attribute features $S_1^2, S_2^2, \ldots,$ and $S_h^2$ of the h target subjects in the image $I_2$, the output value $h_{21}$ and the input value $C_{22}$:

$$o_{21}=\sigma(W_{21}^o \cdot [h_{21},[S_1^2,S_2^2,\ldots S_h^2]]+b_{21}^o)$$

$$h_{12}=o_{11}\tanh(C_{12})$$

$\sigma(\ )$ is a sigmoid function, tanh is an activation function, $W_{21}^o$ is a weight matrix, and $b_{21}^o$ is an offset value.

In the neuron t:

First, a forgotten value $f_{2t-1}$ is calculated based on attribute features $S_1^t, S_2^t, \ldots,$ and $S_h^t$ of the h target subjects in the image $I_t$ and an output value $h_{2t-1}$:

$$f_{2t-1}=\sigma(W_{2t-1}^f \cdot [h_{2t-1},[S_1^t,S_2^t,\ldots S_h^t]]+b_{2t-1}^f)$$

$\sigma(\ )$ is a sigmoid function, $b_{2t-1}^f$ is an offset value, and $W_{2t-1}^f$ is a weight matrix.

Then, an input value $C_{2t}$ is calculated based on the attribute features $S_1^t, S_2^t, \ldots,$ and $S_h^t$ of the h target subjects in the image $I_t$, an input value $C_{2t-1}$, the output value $h_{2t-1}$, and the forgotten value $f_{2t-1}$:

$$i_{2t-1}=\sigma(W_{2t-1}^i \cdot [h_{2t-1},[S_1^t,S_2^t,\ldots S_h^t]]+b_{2t-1}^i)$$

$$\tilde{C}_{2t-1}=\tanh(W_{2t-1}^c \cdot [h_{2t-1},[S_1^t,S_2^t,\ldots S_h^t]]+b_{2t-1}^c)$$

$$C_{2t}=f_{2t-1}*C_{2t-1}+i_{2t-1}*\tilde{C}_{2t-1}$$

$\sigma(\ )$ is a sigmoid function, tanh is an activation function, both $W_{2t-1}^i$ and $W_{2t-1}^c$ are weight matrices, and both $b_{2t-1}^i$ and $b_{2t-1}^c$ and are offset values.

Finally, an output value $h_a$ is calculated based on the attribute features $S_1^t, S_2^t, \ldots,$ and $S_h^t$ of the h target subjects in the image $I_t$, the output value $h_{2t-1}$ and the input value $C_{2t}$:

$$o_{2t-1}=\sigma(W_{2t-1}^o \cdot [h_{2t-1},[S_1^t,S_2^t,\ldots S_h^t]]+b_{2t-1}^o)$$

$$h_{2t}=o_{2t-1}\tanh(C_{2t})$$

$\sigma(\ )$ is a sigmoid function, tanh is an activation function, $W_{2t-1}^o$ is a weight matrix, and $b_{2t-1}^o$ is an offset value.

The foregoing $h_{21}$ to $h_{2t}$ may constitute a second semantic description.

It may be understood that the initial output value $h_{20}$, offset values $b_{20}^f$ to $b_{2t-1}^f$, offset values $b_{20}^i$ to $b_{2t-1}^i$, offset values $b_{20}^c$ to $b_{2t-1}^c$, offset values $b_{20}^o$ to $b_{2t-1}^o$ may be manually set. Weight matrices $W_{20}^f$ to $W_{2t-1}^f$, weight matrices $W_{20}^i$ to $W_{2t-1}^i$, weight matrices $W_{20}^c$ to $W_{2t-1}^c$ are obtained by training a large quantity of known second semantic descriptions, known first semantic descriptions, and attribute features of known target subjects.

The following provides calculation processes in a neuron 1, neuron 2, . . . , and a neuron t in the third time sequence feature extraction unit.

In the neuron 1:

First, a forgotten value $f_{30}$ is calculated based on posture features $Z_1^1, Z_2^1, \ldots,$ and $Z_h^1$ of the h target subjects in the image $I_1$ and an initial output value $h_{30}$:

$$f_{30}=\sigma(W_{30}^f \cdot [h_{30},[Z_1^1,Z_2^1,\ldots Z_h^1]]+b_{30}^f)$$

$\sigma(\ )$ is a sigmoid function, $b_{30}^f$ is an offset value, and $W_{30}^f$ is a weight matrix.

Then, an input value $C_{31}$ is calculated based on the posture features $Z_1^1, Z_2^1, \ldots,$ and $Z_h^1$ of the h target subjects in the image $I_1$, an initial input value $C_{30}$, the initial output value $h_{30}$, and the forgotten value $f_{30}$:

$$i_{30}=\sigma(W_{30}^i \cdot [h_{30},[Z_1^1,Z_2^1,\ldots Z_h^1]]+b_{30}^i)$$

$$\tilde{C}_{30}=\tanh(W_{30}^c \cdot [h_{30},[Z_1^1,Z_2^1,\ldots Z_h^1]]+b_{30}^c)$$

$$C_{31}=f_{30}*C_{30}+i_{30}*\tilde{C}_{30}$$

$\sigma(\ )$ is a sigmoid function, tanh is an activation function, both $W_{30}^i$ and $W_{30}^c$ are weight matrices, and both $b_{30}^i$ and $b_{30}^c$ are offset values.

Finally, an output value $h_{31}$ is calculated based on the posture features $Z_1^1, Z_2^1, \ldots,$ and $Z_h^1$ of the h target subjects in the image $I_1$, the initial output value $h_{30}$ and the input value $C_{31}$:

$$o_{30}=\sigma(W_{30}^o \cdot [h_{30},[Z_1^1,Z_2^1,\ldots Z_h^1]]+b_{30}^o)$$

$$h_{31}=o_{30}\tanh(C_{31})$$

$\sigma(\ )$ is a sigmoid function, tanh is an activation function, $W_{30}^o$ is a weight matrix, and $b_{30}^o$ is an offset value.

In the neuron 2:

First, a forgotten value $f_{31}$ is calculated based on posture features $Z_1^2, Z_2^2, \ldots,$ and $Z_h^2$ of the h target subjects in the image $I_2$ and the output value $h_{31}$:

$$f_{31}=\sigma(W_{31}^f \cdot [h_{31},[Z_1^2,Z_2^2,\ldots Z_h^2]]+b_{31}^f)$$

$\sigma(\ )$ is a sigmoid function, $b_{31}^f$ is an offset value, and $W_{31}^f$ is weight matrix.

Then, an input value $C_{32}$ is calculated based on the posture features $Z_1^2, Z_2^2, \ldots,$ and $Z_h^2$ of the h target subjects in the image $I_2$, an input value $C_{31}$, the output value $h_{31}$, and the forgotten value $f_{31}$:

$$i_{31}=\sigma(W_{31}^i \cdot [h_{31},[Z_1^2,Z_2^2,\ldots Z_h^2]]+b_{31}^i)$$

$$\tilde{C}_{31}=\tanh(W_{31}^c \cdot [h_{31},[Z_1^2,Z_2^2,\ldots Z_h^2]]+b_{31}^c)$$

$$C_{32}=f_{31}*C_{31}+i_{31}*\tilde{C}_{31}$$

$\sigma(\ )$ is a sigmoid function, tanh is an activation function, both $W_{31}^i$ and $W_{31}^c$ are weight matrices, and both $b_{31}^i$ and $b_{31}^c$ are offset values.

Finally, an output value $h_{32}$ is calculated based on the posture features $Z_1^2, Z_2^2, \ldots,$ and $Z_h^2$ of the h target subjects in the image $I_2$, the output value $h_{31}$ and the input value $C_{32}$:

$$o_{31}=\sigma(W_{31}^o \cdot [h_{31},[Z_1^2,Z_2^2,\ldots Z_h^2]]+b_{31}^o)$$

$$h_{32}=o_{31}\tanh(C_{32})$$

$\sigma(\ )$ is a sigmoid function, tanh is an activation function, $W_{31}^o$ is a weight matrix, and $b_{31}^o$ is an offset value.

In the neuron t:

First, a forgotten value $f_{3t-1}$ is calculated based on posture features $Z_1^t, Z_2^t, \ldots,$ and $Z_h^t$ of the h target subjects in the image $I_t$ and an output value $h_{3t-1}$:

$$f_{3t-1} = \sigma(W_{3t-1}^f \cdot [h_{3t-1}, [Z_1^t, Z_2^t, \ldots Z_h^t]] + b_{3t-1}^f)$$

$\sigma(\ )$ is a sigmoid function, $b_{3t-1}^f$ is an offset value, and $W_{3t-1}^f$ is a weight matrix.

Then, an input value $C_{3t}$ is calculated based on the posture features $Z_1^t, Z_2^t, \ldots,$ and $Z_h^t$ of the h target subjects in the image $I_t$, an input value $C_{3t-1}$, the output value $h_{3t-1}$, and the forgotten value $f_{3t-1}$:

$$i_{3t-1} = \sigma(W_{3t-1}^i \cdot [h_{3t-1}, [Z_1^t, Z_2^t, \ldots Z_h^t]] + b_{3t-1}^i)$$

$$\tilde{C}_{3t-1} = \tanh(W_{3t-1}^c \cdot [h_{3t-1}, [Z_1^t, Z_2^t, \ldots Z_h^t]] + b_{3t-1}^c)$$

$$C_{3t} = f_{3t-1} * C_{3t-1} + i_{3t-1} * \tilde{C}_{3t-1}$$

$\sigma(\ )$ is a sigmoid function, tanh is an activation function, both $W_{3t-1}^i$ and $W_{3t-1}^c$ are weight matrices, and both $b_{3t-1}^i$ and $b_{3t-1}^c$ are offset values.

Finally, an output value $h_{3t}$ is calculated based on the posture features $Z_1^t, Z_2^t, \ldots,$ and $Z_h^t$ of the h target subjects in the image $I_t$, the output value $h_{3t-1}$ and the input value $C_{3t}$:

$$o_{3t-1} = \sigma(W_{3t-1}^o \cdot [h_{3t-1}, [Z_1^t, Z_2^t, \ldots Z_h^t]] + b_{3t-1}^o)$$

$$h_{3t} = o_{3t-1} \tanh(C_{3t})$$

$\sigma(\ )$ is a sigmoid function, tanh is an activation function, $W_{3t-1}^o$ is a weight matrix, and $b_{3t-1}^o$ is an offset value.

The foregoing $h_{31}$ to $h_{3t}$ may constitute a third semantic description.

It may be understood that the initial output value $h_{30}$, offset values $b_{30}^f$ to $b_{3t-1}^f$, offset values $b_{30}^i$ to $b_{3t-1}^i$, offset values $b_{30}^c$ to $b_{3t-1}^c$, offset values $b_{30}^o$ to $b_{3t-1}^o$ may be manually set. Weight matrices $W_{30}^f$ to $W_{3t-1}^f$, weight matrices $W_{30}^i$ to $W_{3t-1}^i$, weight matrices $W_{30}^c$ to $W_{3t-1}^c$ are obtained by training a large quantity of known third semantic descriptions, known second semantic descriptions, and posture features of known target subjects.

The following provides calculation processes in a neuron 1, a neuron 2, ..., and a neuron t in the fourth time sequence feature extraction unit.

In the neuron 1:

First, a forgotten value $f_{40}$ is calculated based on relational vector features $G_{12}^1, G_{13}^1, \ldots,$ and $G_{h-1h}^1$ of the h target subjects in the image $I_1$ and an initial output value $h_{40}$:

$$f_{40} = \sigma(W_{40}^f \cdot [h_{40}, [G_{12}^1, G_{13}^1, \ldots G_{h-1h}^1]] + b_{40}^f)$$

$\sigma(\ )$ is a sigmoid function, $b_{40}^f$ is an offset value, and $W_{40}^f$ is a weight matrix.

Then, an input value $C_{41}$ is calculated based on the relational vector features $G_{12}^1, G_{13}^1, \ldots,$ and $G_{h-1h}^1$ of the h target subjects in the image $I_1$, an initial value $C_{40}$, the initial output value $h_{40}$, and the forgotten value $f_{40}$:

$$i_{40} = \sigma(W_{40}^i \cdot [h_{40}, [G_{12}^1, G_{13}^1, \ldots G_{h-1h}^1]] + b_{40}^i)$$

$$\tilde{C}_{40} = \tanh(W_{40}^c \cdot [h_{40}, [G_{12}^1, G_{13}^1, \ldots G_{h-1h}^1]] + b_{40}^c)$$

$$C_{41} = f_{40} * C_{40} + i_{40} * \tilde{C}_{40}$$

$\sigma(\ )$ is a sigmoid function, tanh is an activation function, both $W_{40}^i$ and $W_{40}^c$ are weight matrices, and both $b_{40}^i$ and $b_{40}^c$ are offset values.

Finally, an output value $h_{41}$ is calculated based on the relational vector features $G_{12}^1, G_{13}^1, \ldots,$ and $G_{h-1h}^1$ of the h target subjects in the image $I_1$, the initial output value $h_{40}$ and the input value $C_{41}$:

$$o_{40} = \sigma(W_{40}^o \cdot [h_{40}, [G_{12}^1, G_{13}^1, \ldots G_{h-1h}^1]] + b_{40}^o)$$

$$h_{41} = o_{40} \tanh(C_{41})$$

$\sigma(\ )$ is a sigmoid function, tanh is an activation function, $W_{40}^o$ is a weight matrix, and $b_{40}^o$ is an offset value.

In the neuron 2:

First, a forgotten value $f_{41}$ is calculated based on relational vector features $G_{12}^2, G_{13}^2, \ldots,$ and $G_{h-1h}^2$ of the h target subjects in the image $I_2$ and the output value $h_{41}$:

$$f_{41} = \sigma(W_{41}^f \cdot [h_{41}, [G_{12}^2, G_{13}^2, \ldots G_{h-1h}^2]] + b_{41}^f)$$

$\sigma(\ )$ is a sigmoid function, $b_{41}^f$ is an offset value, and $W_{41}^f$ is a weight matrix.

Then, an input value $C_{42}$ is calculated based on the relational vector features $G_{12}^2, G_{13}^2, \ldots,$ and $G_{h-1h}^2$ of the h target subjects in the image $I_2$, and input value $C_{41}$, the output value $h_{41}$, and the forgotten value $f_{41}$:

$$i_{41} = \sigma(W_{41}^i \cdot [h_{41}, [G_{12}^2, G_{13}^2, \ldots G_{h-1h}^2]] + b_{41}^i)$$

$$\tilde{C}_{41} = \tanh(W_{41}^c \cdot [h_{41}, [G_{12}^2, G_{13}^2, \ldots G_{h-1h}^2]] + b_{41}^c)$$

$$C_{42} = f_{41} * C_{41} + i_{41} * \tilde{C}_{41}$$

$\sigma(\ )$ is a sigmoid function, tanh is an activation function, both $W_{41}^i$ and $W_{41}^c$ are weight matrices, and both $b_{41}^i$ and $b_{41}^c$ are offset values.

Finally, an output value $h_{42}$ is calculated based on the relational vector features $G_{12}^2, G_{13}^2, \ldots,$ and $G_{h-1h}^2$ of the h target subjects in the image $I_2$, the output value $h_{41}$ and the input value $C_{42}$:

$$o_{41} = \sigma(W_{41}^o \cdot [h_{41}, [G_{12}^2, G_{13}^2, \ldots G_{h-1h}^2]] + b_{41}^o)$$

$$h_{42} = o_{41} \tanh(C_{42})$$

$\sigma(\ )$ is a sigmoid function, tanh is an activation function, $W_{41}^o$ is a weight matrix, and $b_{41}^o$ is an offset value.

In the neuron t:

First, a forgotten value $f_{4t-1}$ is calculated based on relational vector features $G_{12}^t, G_{13}^t, \ldots,$ and $G_{h-1h}^t$ of the h target subjects in the image $I_t$ and an output value $h_{4t-1}$:

$$f_{4t-1} = \sigma(W_{4t-1}^f \cdot [h_{4t-1}, [G_{12}^t, G_{13}^t, \ldots G_{h-1h}^t]] + b_{4t-1}^f)$$

$\sigma(\ )$ is a sigmoid function $b_{4t-1}^f$ is an offset value, and $W_{4t-1}^f$ is a weight matrix.

Then, an input value $C_{4t}$ is calculated based on the relational vector features $G_{12}^t, G_{13}^t, \ldots,$ and $G_{h-1h}^t$ of the h target subjects in the image $I_t$, an input value $C_{4t-1}$, the output value $h_{4t-1}$, and the forgotten value $f_{4t-1}$:

$$i_{4t-1} = \sigma(W_{4t-1}^i \cdot [h_{4t-1}, [G_{12}^t, G_{13}^t, \ldots G_{h-1h}^t]] + b_{4t-1}^i)$$

$$\tilde{C}_{4t-1} = \tanh(W_{4t-1}^c \cdot [h_{4t-1}, [G_{12}^t, G_{13}^t, \ldots G_{h-1h}^t]] + b_{4t-1}^c)$$

$$C_{4t} = f_{4t-1} * C_{4t-1} + i_{4t-1} * \tilde{C}_{4t-1}$$

$\sigma(\ )$ is a sigmoid function, tanh is an activation function, both $W_{4t-1}^i$ and $W_{4t-1}^c$ are weight matrices, and both $b_{4t-1}^i$ and $b_{4t-1}^c$ are offset values.

Finally, an output value $h_{4t}$ is calculated based on the relational vector features $G_{12}^t, G_{13}^t, \ldots,$ and $G_{h-1h}^t$ of the h target subjects in the image $I_t$, the output value $h_{4t-1}$ and the input value $C_{4t}$:

$$o_{4t-1} = \sigma(W_{4t-1}^o \cdot [h_{4t-1}, [G_{12}^t, G_{13}^t, \ldots G_{h-1h}^t]] + b_{4t-1}^o)$$

$$h_{4t} = o_{4t-1} \tanh(C_{4t})$$

$\sigma(\ )$ is a sigmoid function, tanh is an activation function, $W_{4t-1}^o$ is a weight matrix, and $b_{4t-1}^o$ is an offset value.

The foregoing $h_{41}$ to $h_{4t}$ may constitute a panoramic semantic description.

It may be understood that the initial output value $h_{40}$, offset values $b_{40}^f$ to $b_{4t-1}^f$, offset values $b_{40}^i$ to $b_{4t-1}^i$, offset values $b_{40}^c$ to $b_{4t-1}^c$, offset values $b_{40}^o$ to $b_{4t-1}^o$ may be manually set. Weight matrices $W_{40}^f$ to $W_{4t-1}^f$, weight matrices $W_{40}^i$ to $W_{4t-1}^i$, weight matrices $W_{40}^c$ to $W_{4t-1}^c$ are obtained by training a large quantity of known panoramic semantic descriptions, known third semantic descriptions, and relational vector features of known target subjects.

Figure 7:
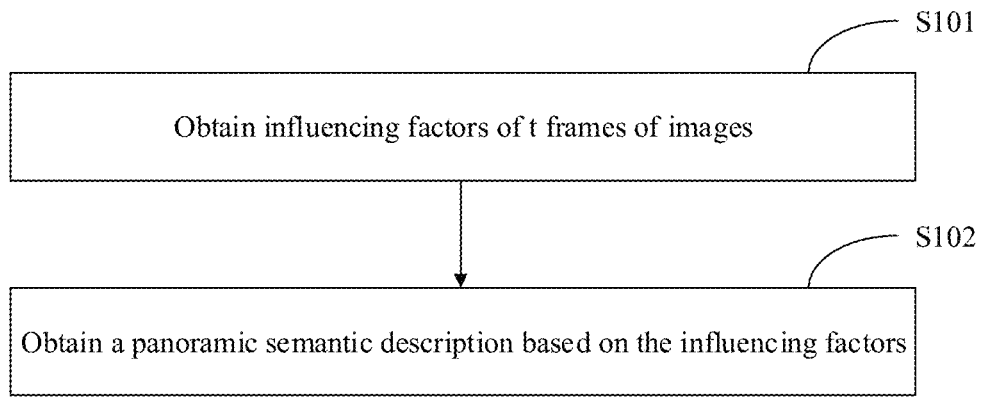
FIG. 7 is a flowchart of a semantic description method according to an embodiment.

FIG. 7 is a schematic diagram of a flowchart of an image analysis method. The image analysis method in this implementation may include the following steps:

S101: An image analysis system obtains influencing factors of t frames of images, where the influencing factors include self-owned features of h target subjects in each of the t frames of images and relational vector features between the h target subjects in each of the t frames of images, and the self-owned features of each target subject include a location feature, an attribute feature, and a posture feature, where t and h are natural numbers greater than 1.

In an exemplary embodiment, the location feature is used to indicate a location of a corresponding target subject in the image. The location feature may be represented as (x, y, w, h), where x and y are a horizontal coordinate and a vertical coordinate of a central point of the target subject in the image, w is a width of the target subject in the image, and h is a height of the target subject in the image.

In an exemplary embodiment, the attribute feature may include a plurality of types of attribute features. Attribute features may be different if target subjects are different. For example, the target subject is a person. The attribute feature of the target subject may include one or more of a gender, a hairstyle, a clothes type, a clothes color, a height, a body size, and the like.

In an exemplary embodiment, the target subject also has a plurality of posture features. Posture features may be different if target subjects are different. For example, the target subject is a person. The posture feature of the target subject may include one or more of falling down, lying down, walking, running, jumping, and the like.

In an exemplary embodiment, the relational feature vector is a vector representing a relationship between two target subjects.

S102: The image analysis system obtains a panoramic semantic description based on the influencing factors.

In an exemplary embodiment, a panoramic semantic model reflects a mapping relationship between the influencing factors and the panoramic semantic description. The panoramic semantic model may be represented as:

$$y=\text{Panorama}(x).$$

x is the influencing factors of the panoramic semantic description, y is the panoramic semantic description, Panorama( ) is the mapping relationship between the influencing factors of the panoramic semantic description and the panoramic semantic description, and Panorama( ) may be obtained by training a large quantity of influencing factors of a known panoramic semantic description and the known panoramic semantic description.

In an exemplary embodiment, the panoramic semantic description can describe relationships between the target subject, relationships between the target subjects and actions, and relationships between the actions.

In an exemplary embodiment, feature extraction is performed on the t frames of images to obtain t feature vectors. Location feature extraction is performed on the t feature vectors to obtain the location features. Attribute feature extraction is performed on the t feature vectors to obtain the attribute features. Posture feature extraction is performed on the t feature vectors to obtain the posture features. Relational vector feature extraction is performed on the t feature vectors to obtain the relational vector features.

In an exemplary embodiment, extraction of the feature vectors, the location features, the attribute features, the posture features, and the relational vector features may be implemented separately by different CNN, or may be integrated into a same CNN. When the extraction of the feature vectors, the location features, the attribute features, the posture features, and the relational vector features is integrated into the same CNN, the extraction of the feature vectors, the location features, the attribute features, the posture features, and the relational vector features may be implemented at one layer in the CNN.

In an exemplary embodiment, a first semantic description is extracted based on the location features. A second semantic description is extracted based on the attribute features and the first semantic description. A third semantic description is extracted based on the posture features and the second semantics. The panoramic semantic description is extracted based on the relational vector features and the third semantic description.

In an exemplary embodiment, the first semantic description to the third semantic description, and the panoramic semantic description may be extracted by different RNN, or may be integrated into a same RNN for extraction. The RNN may include a LSTM model, BiLSTM model, and the like. When the first semantic description to the third semantic description, and the panoramic semantic description are integrated into the same RNN for extraction, the first semantic description to the third semantic description, and the panoramic semantic description may be extracted separately at different layers in the RNN.

For ease of description, definitions of the image, the target subject, the panoramic semantic description, and the like are not described in detail in this embodiment. For details, refer to FIG. 2 and FIG. 3 and descriptions of related definitions of the image, the target subject, the panoramic semantic model, the panoramic semantic description, and the like. The feature vectors, the location features, the attribute features, the posture features, the relational vector features, and extraction manners thereof are not described either in this embodiment. For details, refer to FIG. 4 and related descriptions. In addition, the panoramic semantic model and how to use the panoramic semantic model to perform the panoramic semantic description on the image are not described in detail in this embodiment. For details, refer to FIG. 5, FIG. 6A and FIG. 6B, and related descriptions.

In the solution, the higher-level panoramic semantic description may be obtained based on location features, attribute features, and posture features of a plurality of target subjects in a plurality of frames of images and relational vector features between the plurality of target subjects in the plurality of frames of images, to better reflect relationships between the plurality of subjects, between the subjects and actions, and between the actions in the images.

Figure 8:
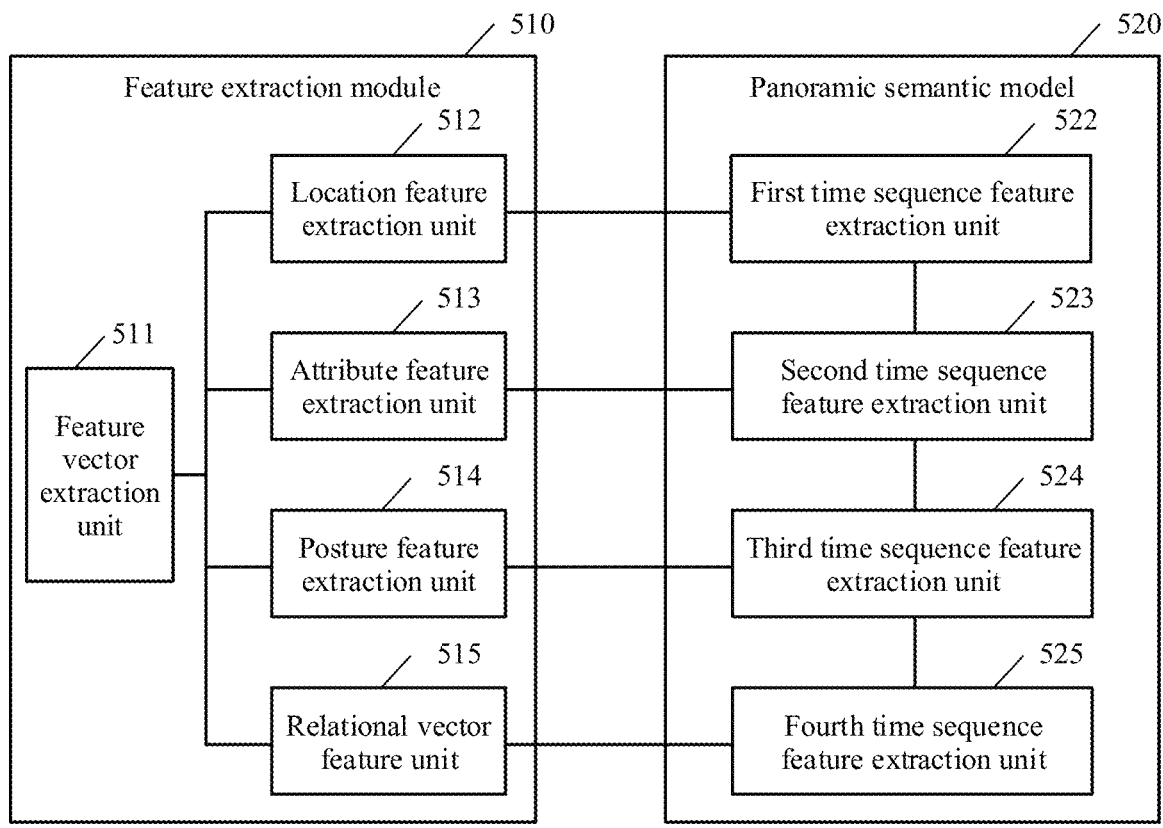
FIG. 8 is a schematic diagram of a structure of a semantic description system according to an embodiment.

FIG. 8 is a schematic diagram of a structure of an image analysis system according to an implementation. The image analysis system in this embodiment includes a feature extraction module 510 and a panoramic semantic description module 520. The feature extraction module 510 includes a feature vector extraction unit 511, a location feature extraction unit 512, an attribute feature extraction unit 513, a posture feature extraction unit 514, and a relational vector feature unit 515. The panoramic semantic descriptor module 520 includes a first time sequence feature extraction unit 522, a second time sequence feature extraction unit 523, a third time sequence feature extraction unit 524, and a fourth time sequence feature extraction unit 525.

The feature extraction module 510 is configured to obtain influencing factors of a panoramic semantic description. The influencing factors include self-owned features of h target subjects in each of t frames of images and relational vector features between the h target subjects in each of the t frames of images, and the self-owned features include a location feature, an attribute feature, and a posture feature, where t and h are natural numbers greater than 1. The location feature is used to indicate a location of a corresponding target subject in the image. The attribute feature is used to indicate an attribute of the corresponding target subject. The posture feature is used to indicate an action of the corresponding target subject. The relational vector features are used to indicate relationships between target subjects.

The panoramic semantic description module 520 is configured to input the influencing factors into a panoramic semantic model to obtain the panoramic semantic description. The panoramic semantic model reflects a mapping relationship between the influencing factors and the panoramic semantic description. The panoramic semantic description can describe the relationships between target subjects, relationships between the target objects and actions, and the relationship between the actions.

In an exemplary embodiment, the location feature is used to indicate the location of the corresponding target subject in the image. The location feature may be represented as (x, y, w, h), where x and y are a horizontal coordinate and a vertical coordinate of a central point of the target subject in the image, w is a width of the target subject in the image, and h is a height of the target subject in the image.

In an exemplary embodiment, the attribute feature may include a plurality of types of attribute features. Attribute features may be different if target subjects are different. For example, the target subject is a person. The attribute feature of the target subject may include one or more of a gender, a hairstyle, a clothes type, a clothes color, a height, a body size, and the like.

In an exemplary embodiment, the target subject also has a plurality of posture features. Posture features may be different if target subjects are different. For example, the target subject is a person. The posture feature of the target subject may include one or more of falling down, lying down, walking, running, jumping, and the like.

In an exemplary embodiment, a relational feature vector is a vector representing a relationship between two target subjects.

In an exemplary embodiment, the panoramic semantic model reflects the mapping relationship between the influencing factors and the panoramic semantic description. The panoramic semantic model may be represented as:

$y=\text{Panorama}(x)$.

x is the influencing factors of the panoramic semantic description, y is the panoramic semantic description, Panorama( ) is the mapping relationship between the influencing factors of the panoramic semantic description and the panoramic semantic description, and Panorama( ) may be obtained by training a large quantity of influencing factors of a known panoramic semantic description and the known panoramic semantic description.

In an exemplary embodiment, the feature vector extraction unit 511 is configured to extract features of the t frames of images to obtain t feature vectors. The location feature extraction unit 512 is configured to extract location features of the t feature vectors to obtain the location features. The attribute feature extraction unit 513 is configured to extract attribute features of the t feature vectors to obtain the attribute features. The posture feature extraction unit 514 is configured to extract posture features of the t feature vectors to obtain the posture features. The relational vector feature unit 515 is configured to extract relational vector features of the t feature vectors to obtain the relational vector features.

In an exemplary embodiment, the feature extraction module 510 includes a CNN. The feature vector extraction unit 511, the location feature extraction unit 512, the attribute feature extraction unit 513, the posture feature extraction unit 514, and the relational vector feature extraction unit 515 are integrated into the CNN. The feature vector extraction unit 511, the location feature extraction unit 512, the attribute feature extraction unit 513, the posture feature extraction unit 514, and the relational vector feature extraction unit 515 may be in different CNN, or may be integrated into a same CNN. The CNN may include a VGGNet, a ResNet, an FPNet, and the like. When the feature vector extraction unit 511, the location feature extraction unit 512, the attribute feature extraction unit 513, the posture feature extraction unit 514, and the relational vector feature extraction unit 515 are integrated into the same CNN, the feature vector extraction unit 511, the location feature extraction unit 512, the attribute feature extraction unit 513, the posture feature extraction unit 514, and the relational vector feature 515 may be a layer in the CNN.

In an exemplary embodiment, the first time sequence feature extraction unit 522 is configured to extract a first semantic description based on the location features. The second time sequence feature extraction unit is configured to extract a second semantic description based on the attribute features and the first semantic description. The third time sequence feature extraction unit is configured to extract a third semantic description based on the posture features and the second semantics. The fourth time sequence feature extraction unit is configured to extract the panoramic semantic description based on the relational vector features and the third semantic description.

In an exemplary embodiment, the panoramic semantic model 522 includes a RNN. The first time sequence feature extraction unit, the second time sequence feature extraction unit, the third time sequence feature extraction unit, and the fourth time sequence feature extraction unit are respectively one layer in the RNN. The first time sequence feature extraction unit to the fourth time sequence feature extraction unit may be in different RNN, or may be integrated into a same RNN. The RNN may include a LSTMmodel, a BiL-STM model, and the like. When the first time sequence feature extraction unit to the fourth time sequence feature extraction unit are integrated into the same RNN, the first time sequence feature extraction unit to the fourth time sequence feature extraction unit may be respectively a layer in the RNN.

For ease of description, definitions of the image, the target subject, the panoramic semantic description, and the like are not described in detail in this embodiment. For details, refer to FIG. 2 and FIG. 3 and descriptions of related definitions of the image, the target subject, the panoramic semantic model, the panoramic semantic description, and the like. The feature vectors, the location features, the attribute features, the posture features, the relational vector features, and extraction manners thereof are not described either in this embodiment. For details, refer to FIG. 4 and related descriptions. In addition, the panoramic semantic model and how to use the panoramic semantic model to perform the panoramic semantic description on the image are not described in detail in this embodiment. For details, refer to FIG. 5, FIG. 6A and FIG. 6B, and related descriptions.

In the solution, the higher-level panoramic semantic description can be obtained based on location features, attribute features, and posture features of a plurality of target subjects in a plurality of frames of images and relational vector features between the plurality of target subjects in the plurality of frames of images, to better reflect relationships between the plurality of subjects, between the subjects and actions, and between the actions in the images.

The image analysis system may be implemented on a compute node, or may be implemented on a cloud compute infrastructure. The following describes how to implement an image analysis system on a compute node and a cloud compute infrastructure.

Figure 9:
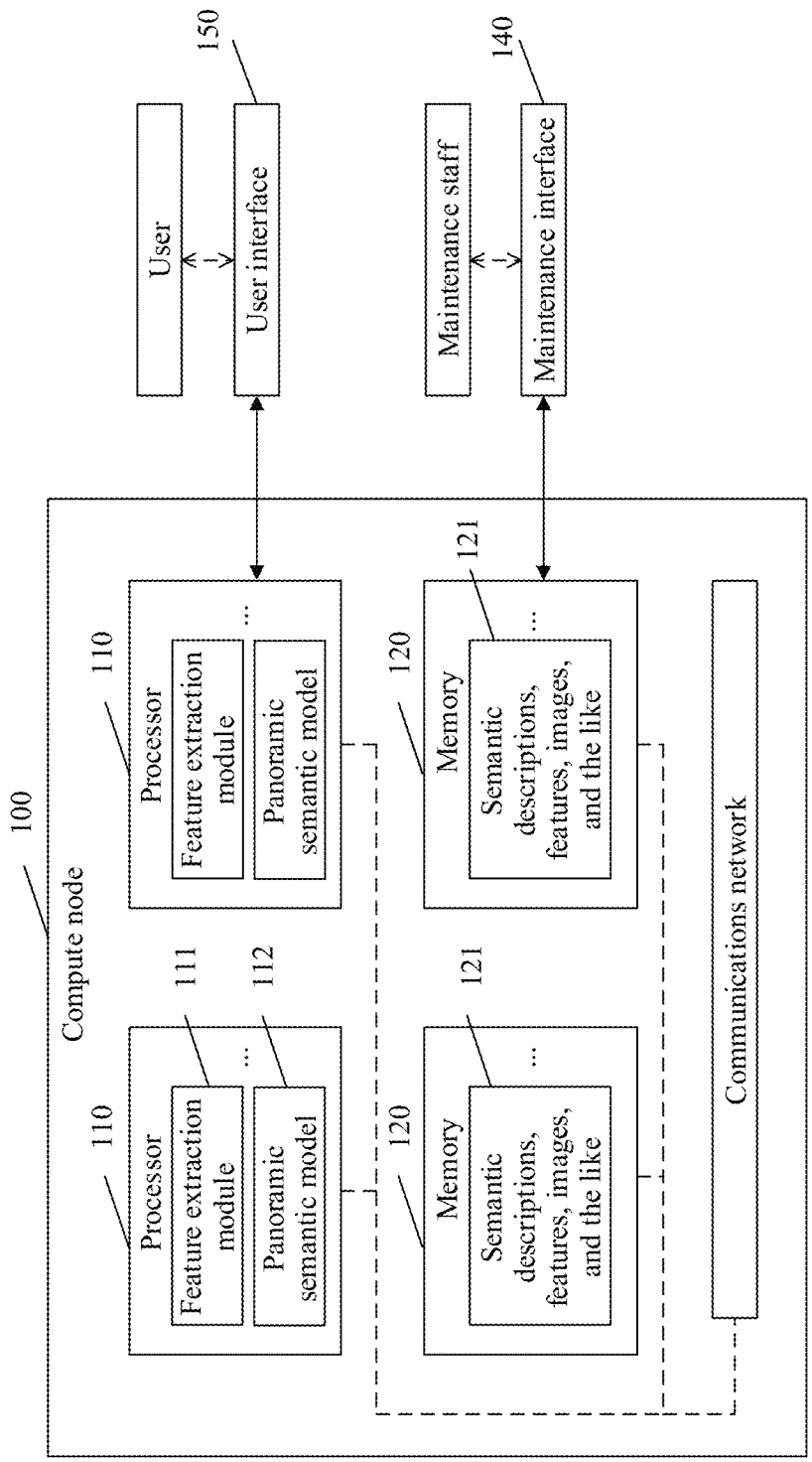
FIG. 9 is a schematic diagram of a structure of a compute node according to an embodiment.

As shown in FIG. 9, a compute node 100 may include a processor 110 and a memory 120. The processor is configured to run a feature extraction module 111 and a panoramic semantic model 112. The memory 120 is configured to store semantic descriptions, features, images, and the like 121. The compute node 100 further provides two external interface windows: a management interface 140 oriented to maintenance staff of a semantic description system and a user interface 150 oriented to a user. The interface window may have various forms, such as a web interface, a command line tool, and a REST interface.

In an exemplary embodiment, the management interface is used by the maintenance staff to input a large quantity of images used for a panoramic semantic description, a large quantity of known panoramic semantic descriptions, known third semantic descriptions, and relational vector features of known target subjects, a large quantity of known third semantic descriptions, known second semantic descriptions, and posture features of known target subjects, a large quantity of known second semantic descriptions, known first semantic descriptions, and attribute features of known target subjects, a large quantity of first semantic descriptions and location features of known target subjects to train the panoramic semantic model.

In an exemplary embodiment, the user interface is used by the user to input images whose panoramic semantic description needs to be extracted. The panoramic semantic description is output to the user through the user interface.

It may be understood that the compute node 100 is merely an example provided in this embodiment, and the compute node 100 may include more or fewer components than shown components, may combine two or more components, or may have different component configurations.

Figure 10:
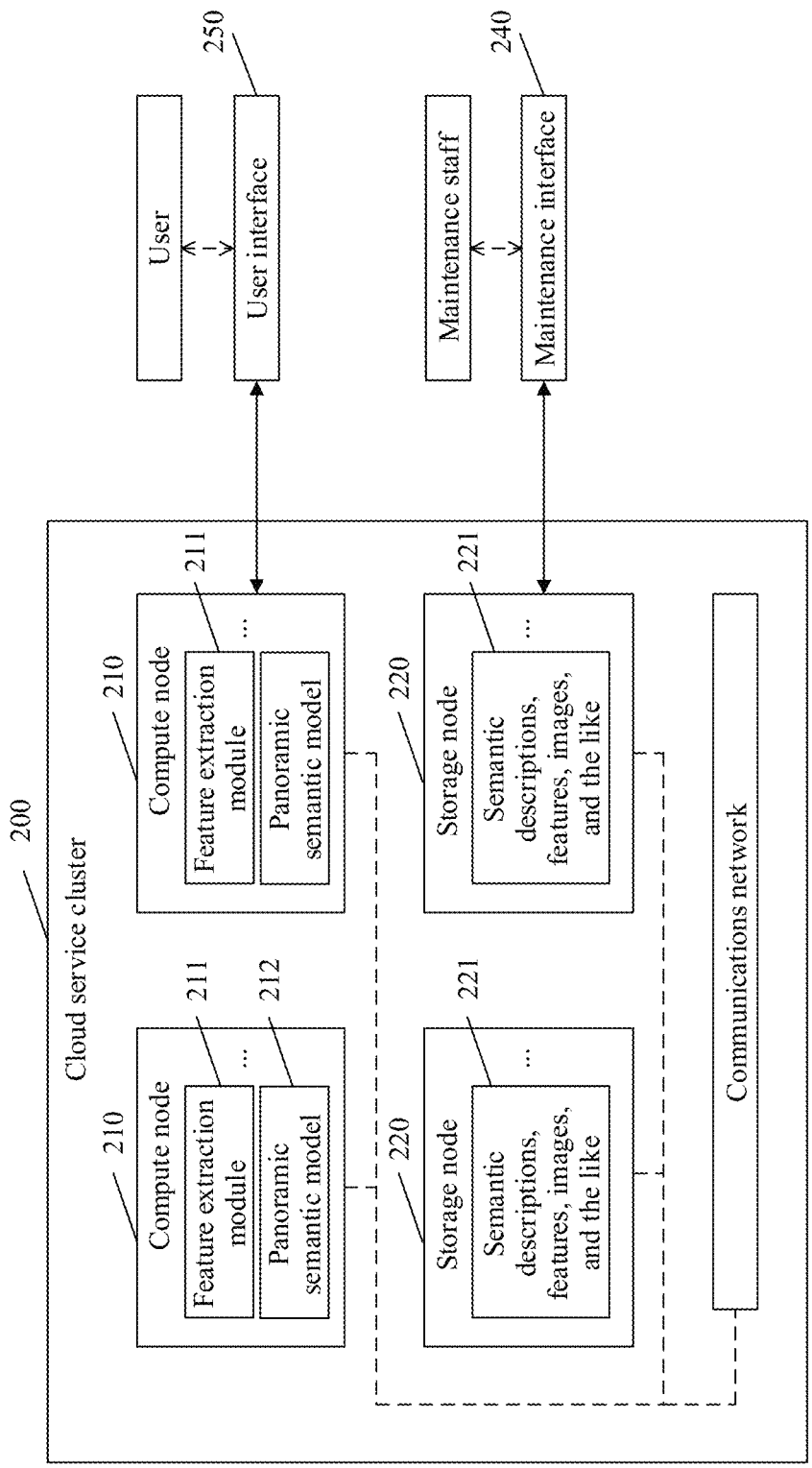
FIG. 10 is a schematic diagram of a structure of a cloud service cluster according to an embodiment.

As shown in FIG. 10, a cloud compute infrastructure may be a cloud service cluster 200. The cloud service cluster 200 includes nodes and a communications network between the nodes. The node may be a compute node, or a virtual machine running on a compute node. The nodes may be classified into two types by function: a compute node 210 and a storage node 220. The compute node 210 is configured to run a feature extraction module 211 and a panoramic semantic model 212. The storage node 220 is configured to store semantic descriptions, features, images, and the like 221. The cloud service cluster 200 further provides two external interface windows: a management interface 240 oriented to maintenance staff of a question answering engine and a user interface 250 oriented to a user. The interface window may have various forms, such as a web interface, a command line tool, and a REST interface.

In an exemplary embodiment, the management interface is used by the maintenance staff to input a large quantity of images used for a panoramic semantic description, a large quantity of known panoramic semantic descriptions, known third semantic descriptions, and relational vector features of known target subjects, a large quantity of known third semantic descriptions, known second semantic descriptions, and posture features of known target subjects, a large quantity of known second semantic descriptions, known first semantic descriptions, and attribute features of known target subjects, a large quantity of first semantic descriptions and location features of known target subjects to train the panoramic semantic model.

In an exemplary embodiment, the user interface is used by the user to input images whose panoramic semantic description needs to be extracted. The panoramic semantic description is output to the user through the user interface.

It may be understood that the cloud service cluster 200 is merely an example provided in this embodiment, and the cloud service cluster 200 may include more or fewer components than shown components, may combine two or more components, or may have different component configurations.

Figure 11:
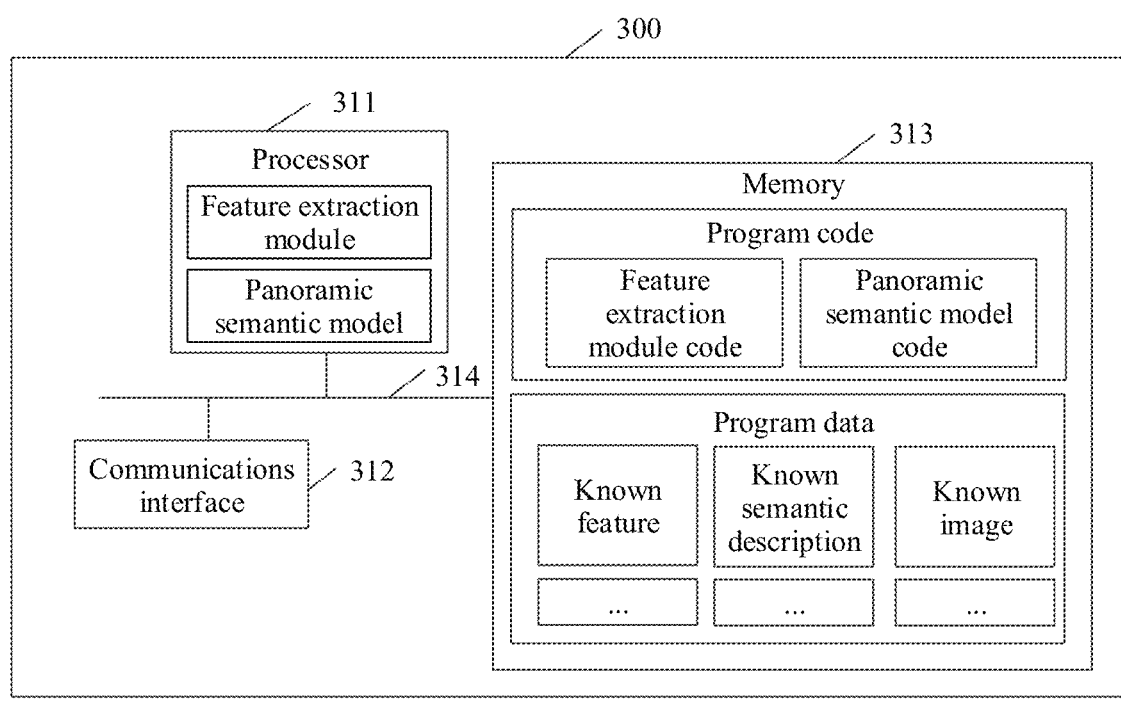
FIG. 11 is a schematic diagram of a structure of a semantic description system according to another embodiment.

FIG. 11 is a schematic diagram of a structure of a semantic description system according to another embodiment. The semantic description system shown in FIG. 8 may be implemented in a compute node 300 shown in FIG. 11. The compute node 300 in this implementation includes one or more processors 311, a communications interface 312, and a memory 313. The processor 311, the communications interface 312, and the memory 313 may be connected through a bus 314.

The processor 311 includes one or more general purpose processors. The general purpose processor may be any type of device that can process an electronic instruction. The general purpose processor includes a central processing unit (CPU), a microprocessor, a microcontroller, a main processor, a controller, an application specific integrated circuit (ASIC), or the like. The processor 311 executes various types of digital storage instructions, for example, software or firmware instructions stored in the memory 313, so that the compute node 300 provides relatively wide range of services. For example, the processor 311 can execute a program or process data, to execute at least a part of the method discussed. The processor 311 may run the feature extraction module and the panoramic semantic model that are shown in FIG. 8.

The communications interface 312 may be a wired interface (for example, an Ethernet interface), and is configured to communicate with another compute node or user.

The memory 313 may include a volatile memory, for example, a random access memory (RAM). The memory may further include a non-volatile memory, for example, a read-only memory (ROM), a flash memory, a hard disk drive (HDD), or a solid-state drive (SSD). Alternatively, the memory may include a combination of the foregoing types of memories. The memory 313 may store program code and program data. The program code includes feature extraction module code and panoramic semantic model code. The program data includes a large quantity of images used for a panoramic semantic description, a large quantity of known panoramic semantic descriptions, known third semantic descriptions, and relational vector features of known target subjects, a large quantity of known third semantic descriptions, known second semantic descriptions, and posture features of known target subjects, a large quantity of known second semantic descriptions, known first semantic descriptions, and attribute features of known target subjects, a large quantity of first semantic descriptions and location features of known target subjects, to train the panoramic semantic model.

The processor 311 may be configured to invoke the program code in the memory 313, to perform the following steps.

The processor 311 is configured to obtain influencing factors of t frames of images. The influencing factors include self-owned features of h target subjects in each of the t frames of images and relational vector features between the h target subjects in each of the t frames of images, and the self-owned features of each target subject include a location feature, an attribute feature, and a posture feature, where t and h are natural numbers greater than 1.

The processor 311 is configured to obtain a panoramic semantic description based on the influencing factors. The panoramic semantic description includes a description of relationships between target subjects, relationships between actions of the target subjects and the target subjects, and relationships between the actions of the target subjects.

For ease of description, definitions of the image, the target subject, the panoramic semantic description, and the like are not described in detail in this embodiment. For details, refer to FIG. 2 and FIG. 3 and descriptions of related definitions of the image, the target subject, the panoramic semantic model, the panoramic semantic description, and the like. The feature vectors, the location features, the attribute features, the posture features, the relational vector features, and extraction manners thereof are not described either in this embodiment. For details, refer to FIG. 4 and related descriptions. In addition, the panoramic semantic model and how to use the panoramic semantic model to perform the panoramic semantic description on the image are not described in detail in this embodiment. For details, refer to FIG. 5, FIG. 6A and FIG. 6B, and related descriptions.

Figure 12:
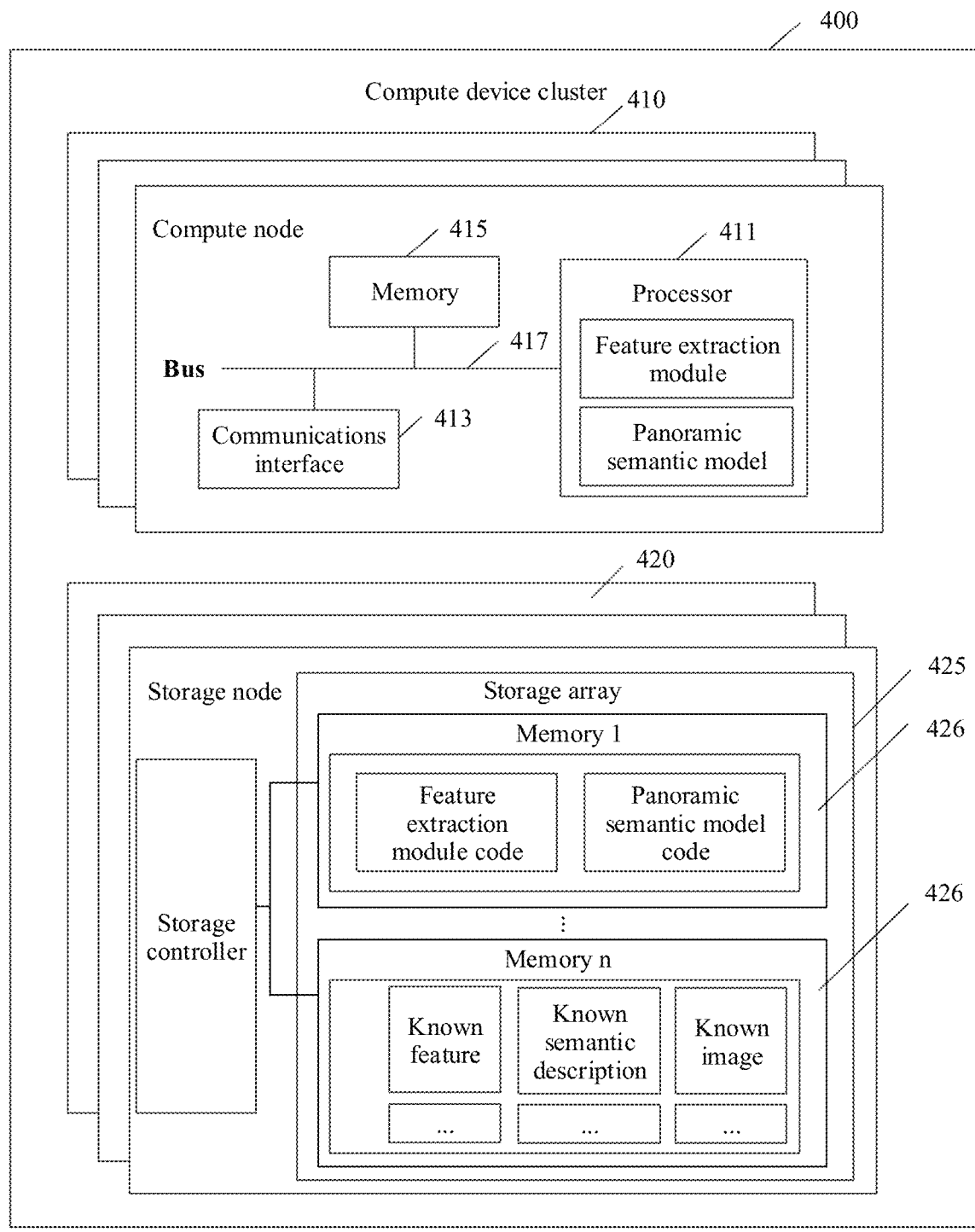
FIG. 12 is a schematic diagram of a structure of a semantic description system according to still another embodiment.

FIG. 12 is a schematic diagram of a structure of a semantic description system according to still another embodiment. The semantic description system in this implementation may be implemented in a cloud service cluster shown in FIG. 12. The cloud service cluster includes at least one compute node 410 and at least one storage node 420.

The compute node 410 includes one or more processors 411, a communications interface 412, and a memory 413. The processor 411, the communications interface 412, and the memory 413 may be connected through a bus 417.

The processor 411 includes one or more general purpose processors. The general purpose processor may be any type of device that can process an electronic instruction. The general purpose processor includes a CPU, a microprocessor, a microcontroller, a main processor, a controller, an ASIC, or the like. The processor 411 can be a dedicated processor for the compute node 410 only or can be shared with other compute nodes 410. The processor 411 executes various types of digital storage instructions, for example, software or firmware instructions stored in the memory 413, so that the compute node 410 provides relatively wide range of services. For example, the processor 411 can execute a program or process data, to execute at least a part of the method discussed. The processor 411 may run the feature extraction module and the panoramic semantic model that are shown in FIG. 8.

The communications interface 412 may be a wired interface (for example, an Ethernet interface), and is configured to communicate with another compute node or user. When the communications interface 412 is the wired interface, the communications interface 412 may use a TCP/IP protocol suite, such as, an RAAS protocol, a remote function call (RFC) protocol, a simple object access protocol (SOAP) protocol, a simple network management protocol (SNMP) protocol, a common object request broker architecture (CORBA) protocol, and a distributed protocol.

The memory 413 may include a volatile memory, for example, a RAM. The memory may further include a non-volatile memory, for example, a ROM, a flash memory, a HDD), or a SSD. Alternatively, the memory may include a combination of the foregoing types of memories.

The compute node 420 includes one or more processors 421, a communications interface 422, and a memory 423. The processor 421, the communications interface 422, and the memory 423 may be connected through a bus 424.

The processor 421 includes one or more general purpose processors. The general purpose processor may be any type of device that can process an electronic instruction. The general purpose processor includes a CPU, a microprocessor, a microcontroller, a main processor, a controller, an ASIC, or the like. The processor 421 can be a dedicated processor for the storage node 420 only or can be shared with other storage nodes 420. The processor 421 executes various types of digital storage instructions, for example, software or firmware instructions stored in the memory 423, so that the storage node 420 provides relatively wide range of services. For example, the processor 421 can execute a program or process data, to execute at least a part of the method discussed.

The communications interface 422 may be a wired interface (for example, an Ethernet interface), and is configured to communicate with another compute device or user.

The storage node 420 includes one or more storage controllers 421 and a storage array 425. The storage controller 421 and the storage array 425 may be connected through a bus 426.

The storage controller 421 includes one or more general purpose processors. The general purpose processor may be any type of device that can process an electronic instruction. The general purpose processor includes a CPU, a microprocessor, a microcontroller, a main processor, a controller, an ASIC, or the like. The storage controller 421 can be a dedicated processor for the storage node 420 only or can be shared with the compute node 410 or other storage nodes 420. It may be understood that, in this embodiment, each storage node includes one storage controller. In another embodiment, a plurality of storage nodes may share one storage controller.

The storage array 425 may include a plurality of memories. The memory may be a non-volatile memory, such as a ROM, a flash memory, an HDD, or an SSD. The memory may also include a combination of the foregoing types of memories. For example, the storage array may include a plurality of HDDs or a plurality of SDDs, or the storage array may include an HDD and an SDD. With the assistance of the storage controller 421, the plurality of memories are combined in different manners to form a memory group, thereby providing higher storage performance and a data backup technology than a single memory. Optionally, the memory array 425 may include one or more data centers. The plurality of data centers may be disposed at a same location, or may be disposed separately at different locations. The storage array 425 may store program code and program data. The program code includes feature extraction module code and panoramic semantic model code. The program data includes a large quantity of images used for a panoramic semantic description, a large quantity of known panoramic semantic descriptions, known third semantic descriptions, and relational vector features of known target subjects, a large quantity of known third semantic descriptions, known second semantic descriptions, and posture features of known target subjects, a large quantity of known second semantic descriptions, known first semantic descriptions, and attribute features of known target subjects, a large quantity of first semantic descriptions and location features of known target subjects, to train a panoramic semantic model.

The compute node 410 may be configured to invoke the program code in the storage node 420, to perform the following steps.

The compute node 410 is configured to obtain influencing factors of t frames of images. The influencing factors include self-owned features of h target subjects in each of the t frames of images and relational vector features between the h target subjects in each of the t frames of images, and the self-owned features of each target subject include a location feature, an attribute feature, and a posture feature, where t and h are natural numbers greater than 1.

The compute node 410 is configured to obtain a panoramic semantic description based on the influencing factors. The panoramic semantic description includes a description of relationships between target subjects, relationships between actions of the target subjects and the target subjects, and relationships between the actions of the target subjects.

For ease of description, definitions of the image, the target subject, the panoramic semantic description, and the like are not described in detail in this embodiment. For details, refer to FIG. 2 and FIG. 3 and descriptions of related definitions of the image, the target subject, the panoramic semantic model, the panoramic semantic description, and the like. The feature vectors, the location features, the attribute features, the posture features, the relational vector features, and extraction manners thereof are not described either in this embodiment. For details, refer to FIG. 4 and related descriptions. In addition, the panoramic semantic model and how to use the panoramic semantic model to perform the panoramic semantic description on the image are not described in detail in this embodiment. For details, refer to FIG. 5, FIG. 6A and FIG. 6B, and related descriptions.

In the solution, the higher-level panoramic semantic description can be obtained based on location features, attribute features, and posture features of a plurality of target subjects in a plurality of frames of images and relational vector features between the plurality of target subjects in the plurality of frames of images, to better reflect relationships between the plurality of subjects, between the subjects and actions, and between the actions in the images.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a SSD), or the like.

What is claimed is:

1. A method comprising:

obtaining influencing factors of t frames of images, the influencing factors comprising self-owned features of h target subjects in each of the t frames of images and relational vector features between the h target subjects in each of the t frames of images, self-owned features of each target subject comprise a location feature, an attribute feature, and a posture feature, t and h are natural numbers greater than 1, the location feature is used to indicate a location of a corresponding target subject in the image, the attribute feature is used to indicate an attribute of the corresponding target subject, the posture feature is used to indicate an action of the corresponding target subject, and the relational vector features are used to indicate relationships between the h target subjects; and obtaining a panoramic semantic description based on the influencing factors, wherein the panoramic semantic description comprises a description of the relationships between the h target subjects, relationships between actions of the h target subjects and the h target subjects, and relationships between the actions of the h target subjects in each of the t frames of images, wherein obtaining of the influencing factors of the panoramic semantic description of the t frames of the images further comprises:

extracting features of the t frames of images to obtain t feature vectors;

extracting location features of the t feature vectors to obtain the location features;

extracting attribute features of the t feature vectors to obtain the attribute features;

extracting posture features of the t feature vectors to obtain the posture features; and extracting relational vector features of the t feature vectors to obtain the relational vector features;

wherein the location features, the attribute features, the posture features, and the relational vector features are extracted by a same convolutional neural network.

2. The method according to claim 1, wherein extraction of the relational vector features of the t feature vectors to obtain the relational vector features further comprises:

performing region-of-interest pooling on a feature vector i based on a target subject a and a target subject b that are in an image i to obtain a feature vector $V_{a,b}$ corresponding to the target subject a and the target subject b, wherein i, a, and b are all natural numbers, $0 < i \leq t$, $1 \leq a, b \leq h$, and the feature vector i is extracted based on the image i;

performing region-of-interest pooling based on the target subject a to obtain a feature vector $V_{a,a}$ corresponding to the target subject a; and calculating a relational vector feature $V^i_{ab}$ between the target subject a and the target subject b that are in the image i according to the following formula:

$$G_{a,b} = \frac{1}{\sum \|v_{a,b}\|}(w_{a,b}(v_{a,b}, v_{a,a})v_{a,b}), \text{ wherein}$$

$W_{a,b}$=sigmoid(w($v_{a,b}$, $V_{a,a}$)), sigmoid( ) is an S-type function, $V_{a,b}$ is the feature vector corresponding to the target subject a and the target subject b, $V_{a,a}$ is the feature vector corresponding to the target subject a, and w( ) is an inner product function.

3. The method according to claim 1, wherein obtaining of the panoramic semantic description based on the influencing factors further comprises:
  extracting a first semantic description based on the location features;
  extracting a second semantic description based on the attribute features and the first semantic description;
  extracting a third semantic description based on the posture features and the second semantics description; and
  extracting the panoramic semantic description based on the relational vector features and the third semantic description.

4. The method according to claim 3, wherein the first semantic description, the second semantic description, and the third semantic description are extracted by a same recurrent neural network.

5. An image analysis system, comprising a feature extraction module and a panoramic semantic model, wherein the feature extraction module is configured to obtain influencing factors of a panoramic semantic description, wherein the influencing factors comprise self-owned features of h target subjects in each of t frames of images and relational vector features between the h target subjects in each of the t frames of images, the self-owned feature comprise a location feature, an attribute feature, and a posture feature, t and h are natural numbers greater than 1, the location feature is used to indicate a location of a corresponding target subject in the image, the attribute feature is used to indicate an attribute of the corresponding target subject, the posture feature is used to indicate an action of the corresponding target subject, and the relational vector features are used to indicate relationships between the h target subjects; wherein the feature extraction module further comprises:
  a feature vector extraction unit configured to extract features of the t frames of images to obtain t feature vectors;
  a location feature extraction unit configured to extract location features of the t feature vectors to obtain the location features;
  an attribute feature extraction unit configured to extract attribute features of the t feature vectors to obtain the attribute features;
  a posture feature extraction unit configured to extract posture features of the t feature vectors to obtain the posture features;
  a relational vector feature unit configured to extract relational vector features of the t feature vectors to obtain the relational vector features;
  wherein the location features, the attribute features, the posture features, and the relational vector features are extracted by a same convolutional neural network; and the panoramic semantic model is configured to obtain the panoramic semantic description based on the influencing factors, wherein the panoramic semantic description comprises a description of the relationships between the h target subjects, relationships between the h target subjects and actions, and relationships between the actions in each of the t frames of images.

6. The system according to claim 5, wherein the relational vector feature extraction unit is configured to:
  perform region-of-interest pooling on a feature vector i based on a target subject a and a target subject b that are in an image i to obtain a feature vector $V_{a,b}$ corresponding to the target subject a and the target subject b, wherein i, a, and b are natural numbers, 0<i≤t, and 1≤a,b≤h; perform region-of-interest pooling based on the target subject a to obtain a feature vector $V_{a,a}$ corresponding to the target subject a; and calculate a relational vector feature $V^i_{ab}$ between the target subject a and the target subject b that are in the image i according to the following formula:

$$G_{a,b} = \frac{1}{\sum \|v_{a,b}\|}(w_{a,b}(v_{a,b}, v_{a,a})v_{a,b}), \text{ wherein}$$

$W_{a,b}$=sigmoid(w($V_{a,b}$, $V_{a,a}$)), sigmoid( ) is an S-type function, $V_{a,b}$ is the feature vector corresponding to the target subject a and the target subject b, $V_{a,a}$ is the feature vector corresponding to the target subject a, and w( ) is an inner product function.

7. The system according to claim 5, wherein the panoramic semantic model further comprises:
  a first time sequence feature extraction unit configured to extract a first semantic description based on the location features;
  a second time sequence feature extraction unit configured to extract a second semantic description based on the attribute features and the first semantic description;
  a third time sequence feature extraction unit configured to extract a third semantic description based on the posture features and the second semantics description; and
  a fourth time sequence feature extraction unit configured to extract the panoramic semantic description based on the relational vector features and the third semantic description.

8. The system according to claim 7, wherein the panoramic semantic model comprises a recurrent neural network, and the first time sequence feature extraction unit, the second time sequence feature extraction unit, the third time sequence feature extraction unit, and the fourth time sequence feature extraction unit are respectively one layer in the recurrent neural network.

9. A compute node cluster, comprising at least one compute node, wherein each compute node comprises a processor and a memory, and the processor executes code in the memory to perform the following method:
  obtaining influencing factors of t frames of images, wherein the influencing factors comprise self-owned features of h target subjects in each of the t frames of images and relational vector features between the h target subjects in each of the t frames of images, self-owned features of each target subject comprise a location feature, an attribute feature, and a posture feature, t and h are natural numbers greater than 1, the location feature is used to indicate a location of a corresponding target subject in the image, the attribute feature is used to indicate an attribute of the corresponding target subject, the posture feature is used to indicate an action of the corresponding target subject, and the relational vector features are used to indicate relationships between the h target subjects; and obtaining a panoramic semantic description based on the influencing factors, wherein the panoramic semantic description comprises a description of the relationships between the h target subjects, relationships between actions of the h target subjects and the h target subjects, and relationships between the actions of the h target subjects in each of the t frames of images, wherein obtaining of the influencing factors of the panoramic semantic description of the t frames of the images further comprises:

extracting features of the t frames of images to obtain t feature vectors;

extracting location features of the t feature vectors to obtain the location features;

extracting attribute features of the t feature vectors to obtain the attribute features;

extracting posture features of the t feature vectors to obtain the posture features; and extracting relational vector features using a sigmoid function of the t feature vectors to obtain the relational vector features;

wherein the location features, the attribute features, the posture features, and the relational vector features are extracted by a same convolutional neural network.

* * * * *